United States Patent
Moriya

(10) Patent No.: US 10,502,623 B2
(45) Date of Patent: Dec. 10, 2019

(54) LINE-NARROWED KRF EXCIMER LASER APPARATUS

(71) Applicant: Gigaphoton Inc., Tochigi (JP)

(72) Inventor: Masato Moriya, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 16/210,097

(22) Filed: Dec. 5, 2018

(65) Prior Publication Data

US 2019/0107438 A1   Apr. 11, 2019

Related U.S. Application Data

(63) Continuation of application No. PCT/JP2016/071508, filed on Jul. 22, 2016.

(51) Int. Cl.
*H01S 3/225*   (2006.01)
*G01J 3/26*   (2006.01)
(Continued)

(52) U.S. Cl.
CPC ............... *G01J 3/26* (2013.01); *H01J 61/28* (2013.01); *H01S 3/139* (2013.01); *H01S 3/225* (2013.01)

(58) Field of Classification Search
CPC .... G01J 3/26; H01S 3/00; H01S 3/225; H01S 3/2256; H01S 3/139
See application file for complete search history.

(56) References Cited

U.S. PATENT DOCUMENTS

| 4,914,662 A * | 4/1990 | Nakatani ............. H01S 3/131 |
| | | 372/29.021 |
| 5,748,316 A | 5/1998 | Wakabayashi et al. |
| | | (Continued) |

FOREIGN PATENT DOCUMENTS

| JP | S50-13476 U | 2/1975 |
| JP | S61-232548 A | 10/1986 |
| | (Continued) | |

OTHER PUBLICATIONS

International Search Report issued in corresponding International Application No. PCT/JP2016/071508; dated Sep. 27, 2016.
(Continued)

*Primary Examiner* — Jonathan M Hansen
(74) *Attorney, Agent, or Firm* — Studebaker & Brackett PC

(57) ABSTRACT

A line-narrowed KrF excimer laser apparatus includes a laser chamber, a line narrow optical system, an actuator, an output coupling mirror, a wavelength detecting unit, and a wavelength controller. The actuator is capable of changing a wavelength of light selected by the line narrow optical system. The wavelength detecting unit includes a low-pressure mercury lamp accommodating mercury, a getter material that adsorbs at least a part of the mercury, and a hot cathode that excites at least a part of the mercury, an etalon provided at a position where reference light emitted from the low-pressure mercury lamp and detected light emitted from the output coupling mirror are incident on the etalon, and a light intensity distribution sensor configured to detect an intensity distribution profile of interference fringes of the reference light and an intensity distribution profile of interference fringes of the detected light.

20 Claims, 16 Drawing Sheets

(51) Int. Cl.
*H01J 61/28* (2006.01)
*H01S 3/139* (2006.01)

(56) References Cited

U.S. PATENT DOCUMENTS

| | | | | |
|---|---|---|---|---|
| 2003/0137672 A1* | 7/2003 | Moriya | ................ | G01J 9/0246 |
| | | | | 356/519 |
| 2009/0278456 A1 | 11/2009 | Fuchs et al. | | |
| 2015/0340837 A1 | 11/2015 | Matsunaga et al. | | |
| 2019/0033133 A1* | 1/2019 | Moriya | ............... | G03F 7/70025 |

FOREIGN PATENT DOCUMENTS

| | | |
|---|---|---|
| JP | H01-102844 A | 4/1989 |
| JP | H06-112571 A | 4/1994 |
| JP | H07-120326 A | 5/1995 |
| JP | 2000-348676 A | 12/2000 |
| JP | 2002-203512 A | 7/2002 |
| JP | 2006-184077 A | 7/2006 |
| JP | 2008-34276 A | 2/2008 |
| WO | 2014/156407 A1 | 10/2014 |

OTHER PUBLICATIONS

International Preliminary Report on Patentability (Chapter I) and Written Opinion of the International Searching Authority; PCT/JP2016/071508; dated Jan. 22, 2019.

* cited by examiner

ARRAY DATA BUFFER

| CHANNEL No. | 0 | 1 | 2 | 3 | 4 | 5 | 6 | 7 | ... | 510 | 511 |
|---|---|---|---|---|---|---|---|---|---|---|---|
| QUANTITY OF LIGHT | ... | ... | ... | ... | ... | ... | ... | ... | ... | ... | ... |

FIG. 20

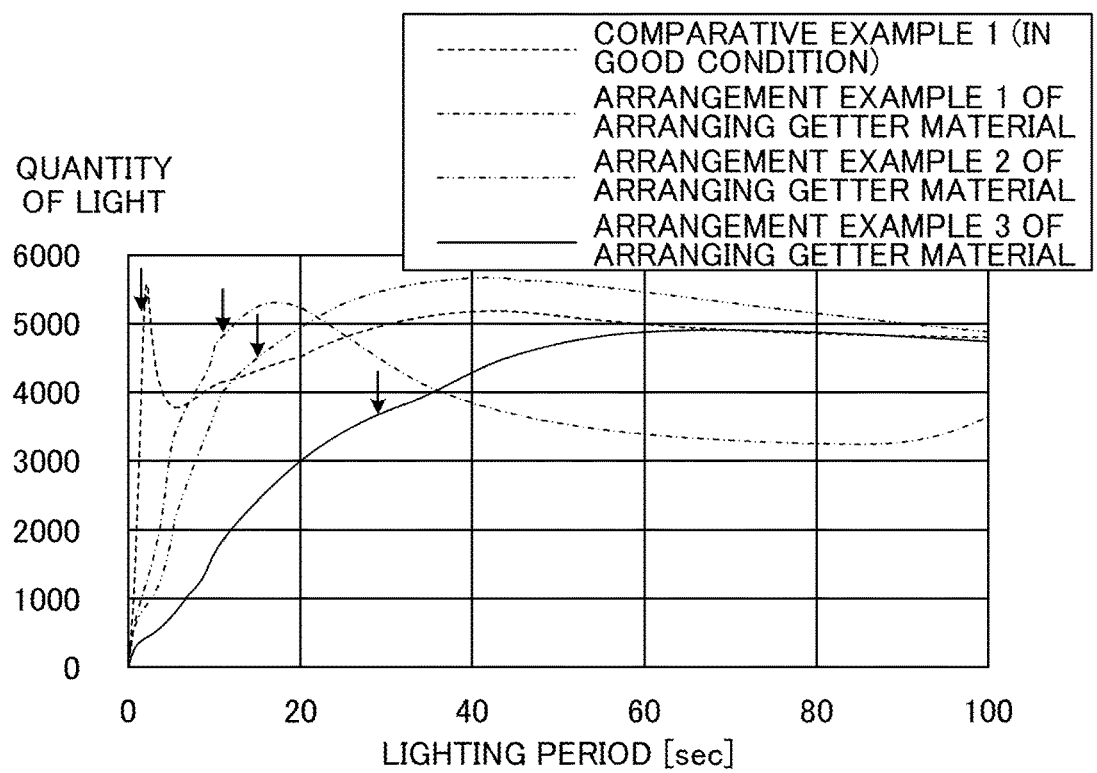

FIG. 21

| | SHORTEST DISTANCE d BETWEEN FILAMENT AND GETTER MATERIAL | TIME OF OCCURRENCE OF DEPRESSION | INTEGRATED QUANTITY OF LIGHT INTEGRATED UNTIL TIME OF OCCURRENCE OF DEPRESSION |
|---|---|---|---|
| COMPARATIVE EXAMPLE 1 (IN GOOD CONDITION) | — | 1.5 sec | 1.0 |
| ARRANGEMENT EXAMPLE 1 OF ARRANGING GETTER MATERIAL | 2 mm | 11 sec | 7.0 |
| ARRANGEMENT EXAMPLE 2 OF ARRANGING GETTER MATERIAL | 4 mm | 15 sec | 11.6 |
| ARRANGEMENT EXAMPLE 3 OF ARRANGING GETTER MATERIAL | 6 mm | 29 sec | 15.4 |

LINE-NARROWED KRF EXCIMER LASER APPARATUS

CROSS-REFERENCE TO RELATED APPLICATIONS

The present application is a continuation application of International Application No. PCT/JP2016/071508 filed on Jul. 22, 2016. The content of the application is incorporated herein by reference in its entirety.

TECHNICAL FIELD

The present disclosure relates to a line-narrowed KrF excimer laser apparatus.

BACKGROUND ART

The recent miniaturization and increased levels of integration of semiconductor integrated circuits have led to a demand for increases in resolutions of semiconductor exposure apparatuses. A semiconductor exposure apparatus is hereinafter referred to simply as "exposure apparatus". Accordingly, exposure light sources to output light at shorter wavelengths have been under development. As the exposure light sources, gas laser apparatuses instead of conventional mercury lamps are typically used. The gas laser apparatuses for exposure include a KrF excimer laser apparatus that outputs an ultraviolet laser beam at a wavelength of 248 nm and an ArF excimer laser apparatus that outputs an ultraviolet laser beam at a wavelength of 193 nm.

As a current exposure technology, immersion exposure has been put to practical use. In the immersion exposure, a gap between a projection lens and a wafer in an exposure apparatus is filled with a fluid such as water to change refractive index in the gap such that an apparent wavelength of the light from the exposure light source is shortened. In a case where immersion exposure is performed using an ArF excimer laser apparatus as an exposure light source, a wafer is irradiated with ultraviolet light whose wavelength in water is equivalent to 134 nm. This technology is referred to as "ArF immersion exposure". The ArF immersion exposure is also referred to as "ArF immersion lithography".

Spectrum line widths of KrF and ArF excimer laser apparatuses in natural oscillation are as wide as approximately 350 pm to 400 pm. This causes a chromatic aberration of an ultraviolet laser beam that is subjected to reduced projection onto a wafer by a projection lens in an exposure apparatus. The chromatic aberration thus causes a reduction in resolving power. Accordingly, spectrum line width of a laser beam that is outputted from a gas laser apparatus needs to be narrowed to such an extent that the chromatic aberration can be ignored. The spectrum line width is also referred to as "spectrum width". To narrow the spectrum width, a laser resonator of a gas laser apparatus is equipped with a line narrow module having a line narrow element. The line narrow element may be an etalon, a grating, or the like. A laser apparatus whose spectrum width is narrowed in this way is referred to as "line narrowed laser apparatus".

Patent Document 1: U.S. Pat. No. 5,748,316 B
Patent Document 2: Japanese Patent Application Publication No. H06-112571 A
Patent Document 3: Japanese Patent Application Publication No. S61-232548 A

SUMMARY

An aspect of the present disclosure relates to a line-narrowed KrF excimer laser apparatus including a laser chamber including a first window and a second window, the laser chamber accommodating a pair of discharge electrodes and configured to seal a laser gas including krypton gas and fluorine gas, a line narrow optical system provided in an optical path of light emitted from the first window, an actuator capable of changing a wavelength of light selected by the line narrow optical system, an output coupling mirror constituting an optical resonator with the line narrow optical system, the output coupling mirror being provided in an optical path of light emitted from the second window and configured to emit a part of the light emitted from the second window, a wavelength detecting unit including a low-pressure mercury lamp accommodating mercury, a getter material that adsorbs at least a part of the mercury, and a hot cathode that excites at least a part of the mercury, an etalon provided at a position where reference light emitted from the low-pressure mercury lamp and detected light emitted from the output coupling mirror are incident on the etalon, and a light intensity distribution sensor configured to detect an intensity distribution profile of interference fringes of the reference light and an intensity distribution profile of interference fringes of the detected light, and a wavelength controller configured to perform calculating a cumulative profile by accumulating the intensity distribution profile of the interference fringes of the reference light and calculating a wavelength of the detected light based on the cumulative profile and the intensity distribution profile of the interference fringes of the detected light, and controlling the actuator based on results of calculation of the wavelength of the detected light.

Another aspect of the present disclosure relates to a line-narrowed KrF excimer laser apparatus including a laser chamber including a first window and a second window, the laser chamber accommodating a pair of discharge electrodes and configured to seal a laser gas including krypton gas and fluorine gas, a line narrow optical system provided in an optical path of light emitted from the first window, an actuator capable of changing a wavelength of light selected by the line narrow optical system, an output coupling mirror constituting an optical resonator with the line narrow optical system, the output coupling mirror being provided in an optical path of light emitted from the second window and configured to emit a part of the light emitted from the second window, a wavelength detecting unit including a low-pressure mercury lamp accommodating mercury, a getter material that adsorbs at least a part of the mercury, and a hot cathode that excites at least a part of the mercury, an etalon provided at a position where reference light emitted from the low-pressure mercury lamp and detected light emitted from the output coupling mirror are incident on the etalon, and a light intensity distribution sensor configured to detect an integrated profile obtained by integrating an intensity distribution profile of the interference fringes of the reference light for a predetermined period from time at which the low-pressure mercury lamp starts emitting the reference light and an intensity distribution profile of interference fringes of the detected light, and a wavelength controller configured to perform calculating a wavelength of the detected light based on the integrated profile and the intensity distribution profile of the interference fringes of the detected light, and controlling the actuator based on results of calculation of the wavelength of the detected light.

BRIEF DESCRIPTION OF DRAWINGS

Exemplary embodiments of the present disclosure will be described below as mere examples with reference to the appended drawings.

FIG. 20 is a graph showing a relationship between the lighting period from the turn-on time at which a low-pressure mercury lamp 8g is turned on and the quantity of light in a line-narrowed excimer laser apparatus according to a second embodiment of the present disclosure.

FIG. 21 shows, for each of arrangement examples 1 to 3 of arranging the getter material shown in FIG. 20, the shortest distance d between a filament 84 and an amalgamated plate 85, the time of an occurrence of a depression from the turn-on time, and the integrated quantity of light integrated until the time of the occurrence of the depression from the turn-on time.

DESCRIPTION OF EMBODIMENTS

Contents

Figure 1:
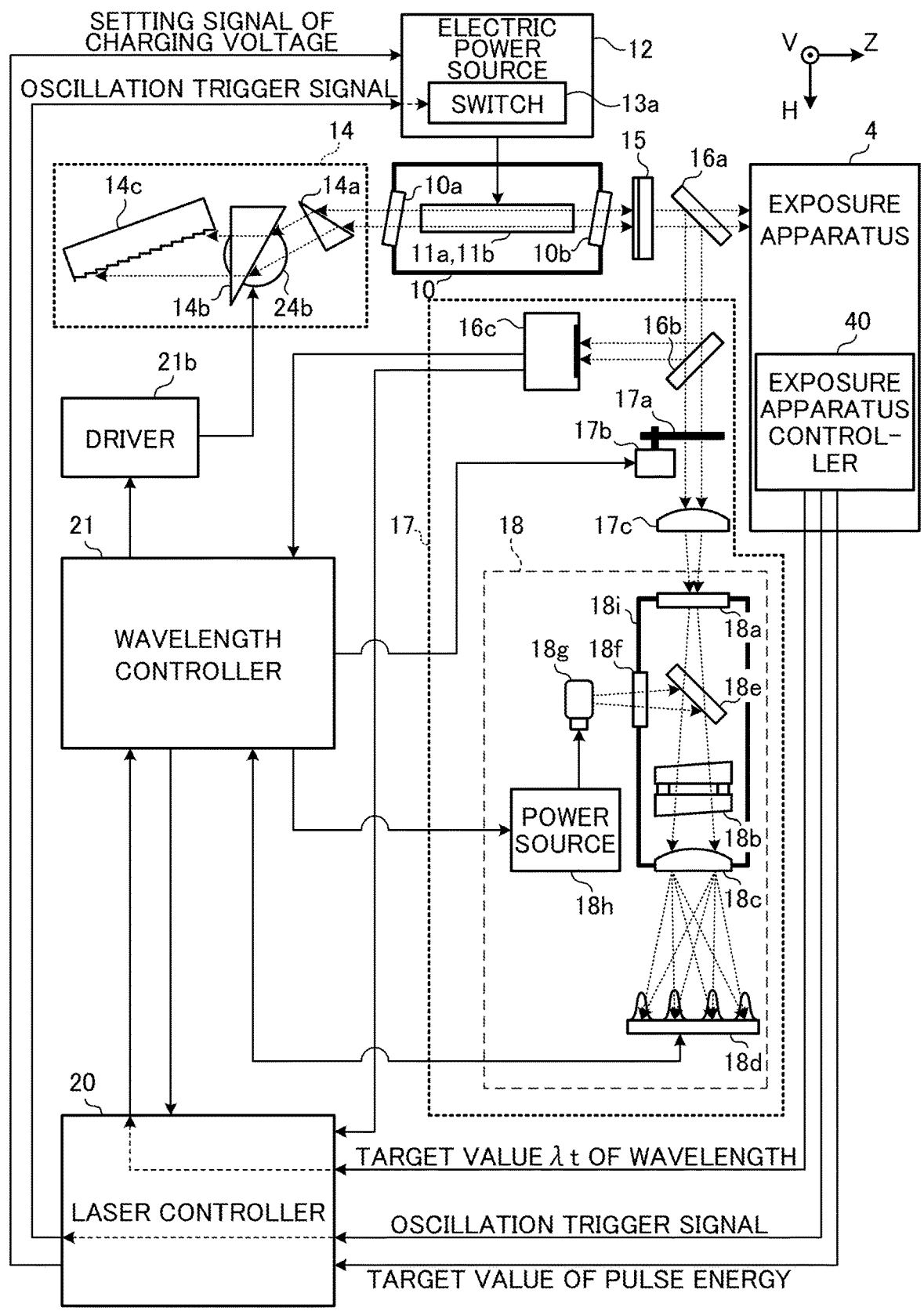
FIG. 1 schematically shows a configuration of a line-narrowed excimer laser apparatus according to each of comparative examples.

1. Summary
2. Laser Apparatus of Comparative Examples
   2.1 Configuration
   2.1.1 Laser Chamber
   2.1.2 Optical Resonator
   2.1.3 Monitoring Module
   2.2 Operation
   2.2.1 Outputting Pulse Laser Beam
   2.2.2 Wavelength Control
   2.3 Problem
3. Low-Pressure Mercury Lamp in Which Getter Material Is Provided
   3.1 Configuration
   3.2 Operation
   3.2.1 First Example
   3.2.2 Second Example
4. Variations in Shortest Distance d between Getter Material and Filament
5. Configuration of Controller Embodiments of the present disclosure will be described in detail below with reference to the drawings. The embodiments described below indicate several examples of the present disclosure, and may not intend to limit the content of the present disclosure. Not all of the configurations and operations described in the embodiments are indispensable in the present disclosure. Identical reference symbols are assigned to identical constituent elements and redundant descriptions thereof are omitted.

1. Summary

An embodiment of the present disclosure relates to a line-narrowed KrF excimer laser apparatus. The line-narrowed KrF excimer laser apparatus includes a laser chamber, a line narrow optical system, an output coupling mirror, and a monitoring module. The line narrow optical system and the output coupling mirror constitute an optical resonator. The laser chamber is provided between the line narrow optical system and the output coupling mirror.

The line narrow optical system includes, for example, a grating and a prism. Changing the posture of the prism causes the angle of incidence of the light incident on the grating to be changed and the selected wavelength of the light selected by the line narrow optical system to be changed. The line narrow optical system selects, for example, a wavelength of approximately 248.4 nm. A pulse laser beam having the wavelength selected by the line narrow optical system is emitted from the output coupling mirror.

Apart of the pulse laser beam emitted from the laser chamber is incident on the monitoring module. In this specification, the pulse laser beam emitted from the laser chamber and incident on the monitoring module is referred to as detected light. The monitoring module includes a low-pressure mercury lamp and an etalon spectrometer. The detected light is incident on the etalon spectrometer. In this specification, the low-pressure mercury lamp is a mercury lamp in which the mercury vapor pressure in an on-state is 100 Pa or lower.

In the low-pressure mercury lamp, at least one isotope of mercury is excited. The low-pressure mercury lamp emits light including a certain wavelength component, which is already known according to the excited isotope, as a main component. The light emitted from the low-pressure mercury lamp passes through a filter and is incident on the etalon spectrometer. In this specification, the light emitted from the low-pressure mercury lamp and incident on the etalon spectrometer is referred to as reference light. The etalon spectrometer detects both the interference fringes of the detected light having an unknown wavelength and the interference fringes of the reference light including the certain wavelength component, which is already known, as a main component.

Based on the interference fringes of the detected light and the interference fringes of the reference light, the wavelength controller calculates an absolute wavelength of the detected light. The wavelength controller controls the line narrow optical system based on the calculated absolute wavelength of the detected light. Feedback control of the wavelength of the pulse laser beam emitted from the laser chamber is thus performed.

In an embodiment of the present disclosure, the low-pressure mercury lamp includes getter material including amalgam. The getter material adsorbs at least a part of the mercury in the low-pressure mercury lamp, suppressing the mercury vapor pressure in the low-pressure mercury lamp. Further, in an embodiment of the present disclosure, the wavelength controller accumulates the intensity distribution profile of the interference fringes of the reference light for a certain period. The interference fringes of the reference light are thus read accurately.

2. Laser Apparatus of Comparative Examples
2.1 Configuration

FIG. 1 schematically shows a configuration of a line-narrowed excimer laser apparatus according to each of comparative examples. FIG. 1 shows a configuration common to comparative examples 1 and 2 described below. The line-narrowed excimer laser apparatus shown in FIG. 1 includes a laser chamber 10, a pair of discharge electrodes 11a and 11b, an electric power source 12, a line narrow optical system 14, and an output coupling mirror 15. The line narrow optical system 14 and the output coupling mirror 15 constitute an optical resonator. The laser chamber 10 is provided in an optical path of the optical resonator. The line-narrowed excimer laser apparatus further includes a monitoring module 17, a laser controller 20, and a wavelength controller 21. The line-narrowed excimer laser apparatus may be a master oscillator that outputs a seed beam to be entered to an unillustrated amplifier.

FIG. 1 shows an internal configuration of the line-narrowed excimer laser apparatus as viewed in a direction substantially parallel to the direction of electric discharge between the discharge electrodes 11a and 11b. The traveling direction of the pulse laser beam outputted from the output coupling mirror 15 is a Z direction. A direction of electric discharge between the discharge electrodes 11a and 11b is a V direction or a −V direction. A direction perpendicular to both these directions is an H direction. The −V direction substantially coincides with the direction of gravity.

2.1.1 Laser Chamber

The laser chamber 10 is a chamber that seals a laser gas as a laser medium including a rare gas such as krypton gas, a halogen gas such as fluorine gas, and a buffer gas such as neon gas. Respective ends of the laser chamber 10 have windows 10a and 10b. The window 10a corresponds to a first window and the window 10b corresponds to a second window.

The discharge electrodes 11a and 11b are provided in the laser chamber 10 as electrodes to excite the laser medium by an electric discharge. The longitudinal directions of the discharge electrodes 11a and 11b substantially coincide with the Z direction. The electric power source 12 includes an unillustrated charger and an unillustrated pulse power module. The pulse power module includes a switch 13a.

As shown in FIG. 1, the windows 10a and 10b are arranged such that the planes of incidence of the light incident on these windows are substantially parallel to an HZ plane and the angles of incidence of the light are substantially Brewster's angle.

2.1.2 Optical Resonator

The line narrow optical system 14 includes two prisms 14a and 14b and a grating 14c. The prisms 14a and 14b and the grating 14c are supported by unillustrated holders. One of the unillustrated holders, which supports the prism 14b, includes a rotary stage 24b including an actuator for rotating the prism 14b around an axis parallel to a V axis.

A surface of each of the prisms 14a and 14b is coated with a film to suppress reflection of at least p-polarized light.

The surface of the grating 14c is constituted by a high-reflective material and multiple grooves are formed at predetermined intervals. Each of the grooves has, for example, a right-triangle cross-sectional shape.

A first surface of the output coupling mirror 15 faces the laser chamber 10. The first surface is coated with a partially reflective film. A second surface of the output coupling mirror 15 is located opposite to the first surface. The second surface is coated with an anti-reflective film.

2.1.3 Monitoring Module

A beam splitter 16a is provided in an optical path of the pulse laser beam between the output coupling mirror 15 and an exposure apparatus 4. The beam splitter 16a transmits a part of the pulse laser beam outputted from the output coupling mirror 15 to the exposure apparatus 4 at a high transmittance and reflects another part to the monitoring module 17 as the detected light.

The monitoring module 17 includes a beam splitter 16b, an energy sensor 16c, a shutter 17a, a focusing lens 17c, and a wavelength detecting unit 18.

The beam splitter 16b is provided in an optical path of the detected light reflected by the beam splitter 16a. The beam splitter 16b transmits a part of the detected light and reflects another part.

The energy sensor 16c is provided in an optical path of the detected light reflected by the beam splitter 16b. The energy sensor 16c is constituted by a photodiode, a photoelectric tube, or a pyroelectric element.

The shutter 17a is provided in an optical path of the detected light transmitted by the beam splitter 16b. The shutter 17a is capable of being switched by an actuator 17b between an open state and a closed state.

The focusing lens 17c is provided in the optical path of the detected light having passed through the shutter 17a in the open state. The shutter 17a in the closed state prevents the detected light from passing therethrough and reaching the focusing lens 17c.

The wavelength detecting unit 18 is provided in the optical path of the detected light having passed through the focusing lens 17c. The wavelength detecting unit 18 includes a diffusing plate 18a, an etalon 18b, a focusing lens 18c, a line sensor 18d, a beam splitter 18e, a filter 18f, a low-pressure mercury lamp 18g, and a power source 18h for the lamp. The etalon 18b and the beam splitter 18e are accommodated in a housing 18i. The diffusing plate 18a, the focusing lens 18c, and the filter 18f are attached to the housing 18i. The etalon 18b, the focusing lens 18c, and the line sensor 18d constitute an etalon spectrometer.

The diffusing plate 18a is provided in the optical path of the detected light converged by the focusing lens 17c. The diffusing plate 18a has multiple projections and depressions on the surface thereof and configured to diffuse the detected light when transmitting the detected light from the exterior of the housing 18i to the interior of the housing 18i.

The beam splitter 18e is provided in the optical path of the detected light transmitted by the diffusing plate 18a. The beam splitter 18e transmits the detected light having a wavelength of, for example, approximately 248.4 nm.

The low-pressure mercury lamp 18g is provided outside of the housing 18i. The low-pressure mercury lamp 18g is configured to receive an electric power from the power source 18h and emit light. The low-pressure mercury lamp 18g is a hot-cathode typed low-pressure mercury lamp that seals mercury including an isotope having mass number 202 at a ratio of 49% or higher. Preferably, the ratio of the isotope having mass number 202 in the mercury is 90% or higher, and more preferably 95% or higher. The light emitted from the low-pressure mercury lamp 18g includes a wavelength component of 253.7 nm as a main component.

The filter 18f is a band-pass filter that transmits the wavelength component of 253.7 nm included in the light emitted from the low-pressure mercury lamp 18g. The filter 18f transmits the reference light including the wavelength component of 253.7 nm from the exterior of the housing 18i to the interior of the housing 18i.

The beam splitter 18e is provided in an optical path of the reference light transmitted by the filter 18f. The beam splitter 18e reflects the reference light including the wavelength component of 253.7 nm.

A beam of the detected light transmitted by the beam splitter 18e and a beam of the reference light reflected by the beam splitter 18e have substantially the same diverging angles. These beams go through substantially the same optical paths and are incident on the etalon 18b.

The etalon 18b includes two partially reflective mirrors. The partially reflective mirrors face each other with an air gap having a predetermined width and adhere to each other via spacers. Each of the partially reflective mirrors has a predetermined reflectance for light having a wavelength of 248.4 nm and light having a wavelength of 253.7 nm.

The focusing lens 18c is provided in the optical path of the detected light and the reference light having passed through the etalon 18b. The line sensor 18d is provided in the optical path of the detected light and the reference light having passed through the focusing lens 18c. The line sensor 18d is provided in a focal plane of the focusing lens 18c. The line sensor 18d is a light intensity distribution sensor including a one-dimensional array of multiple light-receiving elements. The line sensor 18d sends data of the intensity distribution profile of the interference fringes formed by the etalon 18b and the focusing lens 18c to the wavelength controller 21. The line sensor 18d detects an integrated quantity of light obtained by time-integration of the quantity of light in each of the light-receiving elements and sets an integrated profile showing the distribution of the integrated quantity of light as the data of the intensity distribution profile of the interference fringes. Instead of the line sensor 18d, an image sensor including a two-dimensional array of multiple light-receiving elements may be used as the light intensity distribution sensor.

2.2 Operation
2.2.1 Outputting Pulse Laser Beam

The exposure apparatus 4 includes an exposure apparatus controller 40. The exposure apparatus controller 40 sends an oscillation trigger signal, setting data on a target value of pulse energy, and setting data on a target value $\lambda t$ of the wavelength to the laser controller 20. The laser controller 20 sends the oscillation trigger signal to the switch 13a in the electric power source 12 based on the oscillation trigger signal received from the exposure apparatus controller 40.

Upon receiving the oscillation trigger signal from the laser controller 20, the switch 13a in the electric power source 12 is turned on. When the switch 13a is turned on, the electric power source 12 generates a pulsed high voltage from the electric energy charged in the charger and applies the high voltage across the discharge electrodes 11a and 11b.

The high voltage applied across the discharge electrodes 11a and 11b causes an electric discharge to be generated between the discharge electrodes 11a and 11b. The energy of the electric discharge causes the laser medium in the laser chamber 10 to be excited and to shift to a high energy level. The excited laser medium then shifts back to a low energy level to emit light having a wavelength according to the difference in the energy levels.

The light generated in the laser chamber 10 is emitted via the windows 10a and 10b to the outside of the laser chamber 10. The beam width of the light emitted from the window 10a of the laser chamber 10 is expanded by the prisms 14a and 14b in the H direction, which is substantially perpendicular to the direction of the electric discharge, and is incident on the grating 14c.

The light incident on the grating 14c from the prisms 14a and 14b is reflected by the grooves of the grating 14c and diffracted to directions according to the wavelengths of the light. The grating 14c is in a Littrow arrangement such that the angle of incidence of the light incident on the grating 14c from the prisms 14a and 14b and the angle of diffraction of the diffracted light having the desired wavelength coincide with each other. The light having a wavelength around the desired wavelength is thus returned via the prisms 14a and 14b to the laser chamber 10.

The output coupling mirror 15 transmits and outputs a part of the light emitted from the window 10b of the laser chamber 10 and reflects and returns another part to the laser chamber 10.

The light emitted from the laser chamber 10 thus reciprocates between the line narrow optical system 14 and the output coupling mirror 15. The light is amplified each time it passes through the electric discharge space between the discharge electrodes 11a and 11b. Further, a wavelength component of approximately 248.4 nm is selected each time the light is returned by the line narrow optical system 14 and thus the wavelength spectrum is narrowed. The arrangement of the windows 10a and 10b described above and the coating of the prisms 14a and 14b cause a polarized light component polarized in the H direction to be selected. A pulse laser beam is thus generated by laser oscillation and outputted from the output coupling mirror 15.

The energy sensor 16c detects the pulse energy of the detected light reflected by the beam splitter 16b. The energy sensor 16c sends an electric signal according to the pulse energy of the detected light to each of the laser controller 20 and the wavelength controller 21.

The laser controller 20 sends a setting signal of the charging voltage to the electric power source 12 based on the pulse energy detected by the energy sensor 16c and the setting data on the target value of the pulse energy received from the exposure apparatus controller 40. By setting the charging voltage of the electric power source 12, the laser controller 20 performs feedback control of the pulse energy of the pulse laser beam.

The wavelength controller 21 controls the actuator 17b to open and close the shutter 17a. The wavelength controller 21 further controls the power source 18h to turn on and off the low-pressure mercury lamp 18g. To acquire the intensity distribution profile of the interference fringes of the reference light, the wavelength controller 21 causes the shutter 17a to be closed and the low-pressure mercury lamp 18g to be turned on. The wavelength controller 21 then outputs a data trigger to the line sensor led. The wavelength controller 21 then receives data of the intensity distribution profile of the interference fringes outputted from the line sensor 18d. The wavelength controller 21 thus acquires the data of the intensity distribution profile of the interference fringes of the reference light having a certain wavelength that is already known.

To measure the wavelength of the detected light, the wavelength controller 21 causes the low-pressure mercury lamp 18g to be turned off and the shutter 17a to be open. Upon receiving the pulse energy from the energy sensor 16c, the wavelength controller 21 outputs the data trigger to the line sensor 18d. The wavelength controller 21 then receives the data of the intensity distribution profile of the interference fringes outputted from the line sensor 18d. The wavelength controller 21 thus acquires the data of the intensity distribution profile of the interference fringes of the detected light having an unknown wavelength. Based on a fringe radius of the detected light and a fringe radius of the reference light, the wavelength controller 21 calculates the absolute wavelength $\lambda$ abs of the detected light.

The wavelength controller 21 receives the setting data on the target value $\lambda t$ of the wavelength from the laser controller 20. Based on the results of the calculation of the absolute wavelength $\lambda$ abs of the detected light and the setting data on the target value $\lambda t$ of the wavelength received from the laser controller 20, the wavelength controller 21 sends a control signal to a driver 21b to control the rotary stage 24b of the holder supporting the prism 14b. The rotation of the prism 14b around the axis parallel to the V direction causes the angle of incidence of the light incident on the grating 14c to be changed and thus the selected wavelength to be changed.

2.2.2 Wavelength Control

Figure 2:
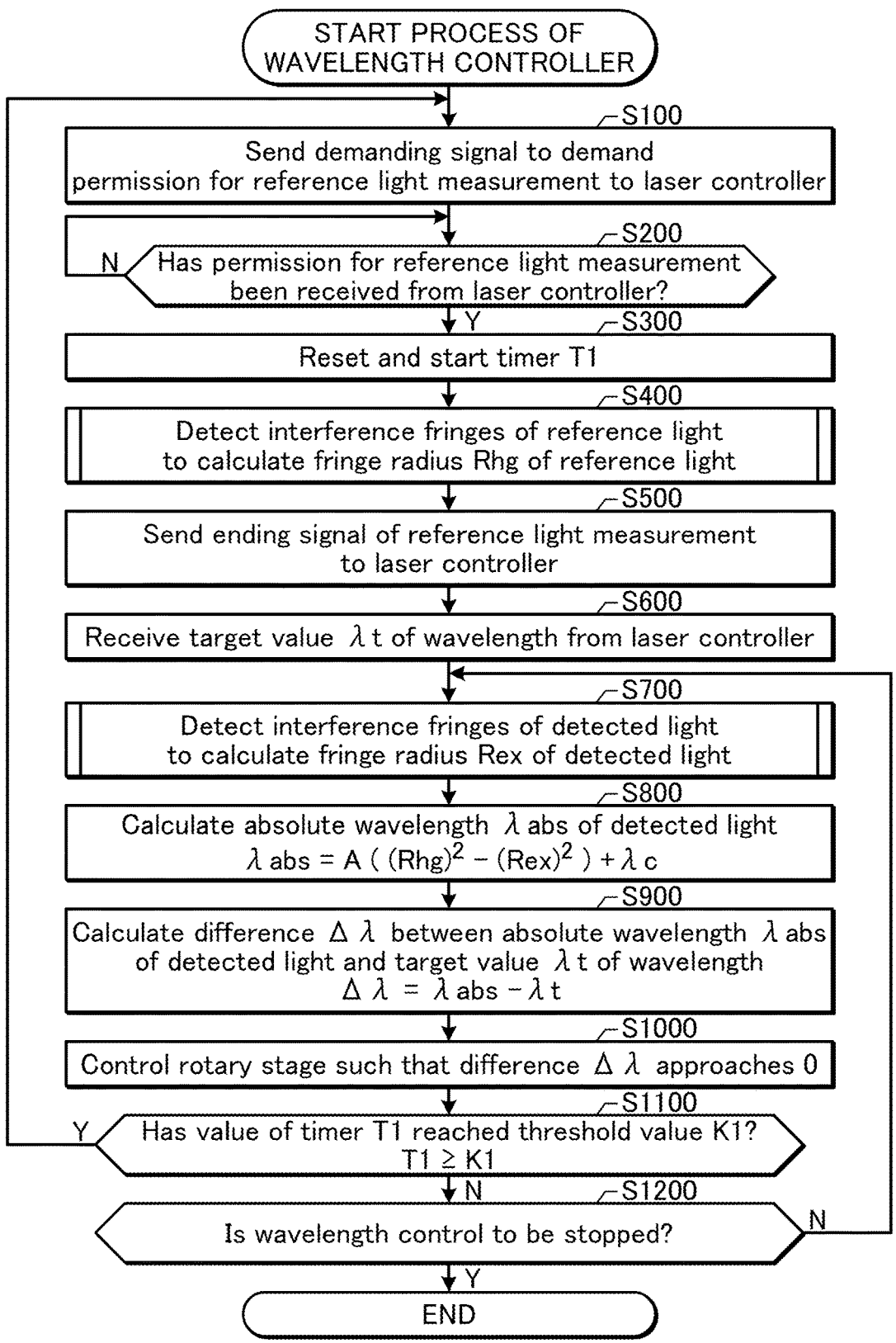
FIG. 2 is a flowchart showing a wavelength control process in each of the comparative examples.

FIG. 2 is a flowchart showing a wavelength control process of each of the comparative examples. In the following process, the wavelength controller 21 measures the interference fringes of the reference light and the interference fringes of the detected light and controls the wavelength of the pulse laser beam based on the interference fringes.

First, at S100, the wavelength controller 21 sends a demanding signal to the laser controller 20. The demanding signal is to demand permission for a reference light measurement.

Next, at S200, the wavelength controller 21 determines whether or not it has received the permission for the reference light measurement from the laser controller 20. If the wavelength controller 21 has not received the permission for the reference light measurement, the wavelength controller 21 waits until receiving the permission for the reference light measurement. If the wavelength controller 21 has received the permission for the reference light measurement, the wavelength controller 21 proceeds to S300.

At S300, the wavelength controller 21 resets and starts a timer T1. The timer T1 is used at S1100 to determine the timing of the measurement of the reference light.

Next, at S400, the wavelength controller 21 detects the interference fringes of the reference light and calculates a fringe radius Rhg of the reference light. Details of S400 are described below with reference to FIGS. 3 and 4.

Next, at S500, the wavelength controller 21 sends an ending signal of the reference light measurement to the laser controller 20.

Next, at S600, the wavelength controller 21 receives the setting data on the target value $\lambda t$ of the wavelength from the laser controller 20.

Next, at S700, the wavelength controller 21 detects interference fringes of the detected light and calculates a fringe radius Rex of the detected light. Details of S700 are described below with reference to FIG. 5.

Next, at S800, the wavelength controller 21 calculates the absolute wavelength $\lambda$ abs of the detected light by the following formula.

$$\lambda \text{ abs} = A(Rhg)^2 - (Rex)^2) + \lambda c$$

Here, $\lambda c$ is a constant value and corresponds to an absolute wavelength of the detected light in a case where the fringe radius Rex of the detected light and the fringe radius Rhg of the reference light are the same. A is a positive number that is set as a constant of proportionality. The larger the fringe radius Rex of the detected light is, the shorter the absolute wavelength $\lambda$ abs of the detected light is.

Next, at S900, the wavelength controller 21 calculates the difference $\Delta\lambda$ between the absolute wavelength $\lambda$ abs of the detected light and the target value $\lambda t$ of the wavelength by the following formula.

$$\Delta\lambda = \lambda \text{ abs} - \lambda t$$

Next, at S1000, the wavelength controller 21 controls the rotary stage 24b of the holder, which supports the prism 14b, such that the difference $\Delta\lambda$ approaches 0.

Next, at S1100, the wavelength controller 21 determines whether or not the value of the timer T1 has reached a threshold value K1.

If the value of the timer T1 has not reached the threshold value K1 (S1100: NO), the wavelength controller 21 proceeds to S1200. At S1200, the wavelength controller 21 determines whether or not the wavelength control is to be stopped. If the wavelength control is to be stopped (S1200: YES), the wavelength controller 21 ends the process of this flowchart. If the wavelength control is not to be stopped (S1200: NO), the wavelength controller 21 returns to S700 and repeats the subsequent process to repeat the calculation of the absolute wavelength of the detected light.

If the value of the timer T1 has reached the threshold value K1 (S1100: YES), the wavelength controller 21 returns to S100 and performs subsequent process to update the fringe radius Rhg of the reference light.

As described above, the frequency of detecting the interference fringes of the reference light may be lower than that of the detected light. The threshold value K1 that is set as a cycle of detecting the interference fringes of the reference light may be 5 minutes or more. If the characteristics of the etalon 18b are stable, the threshold value K1 may be 1 day or more and 1 week or less.

Figure 3:
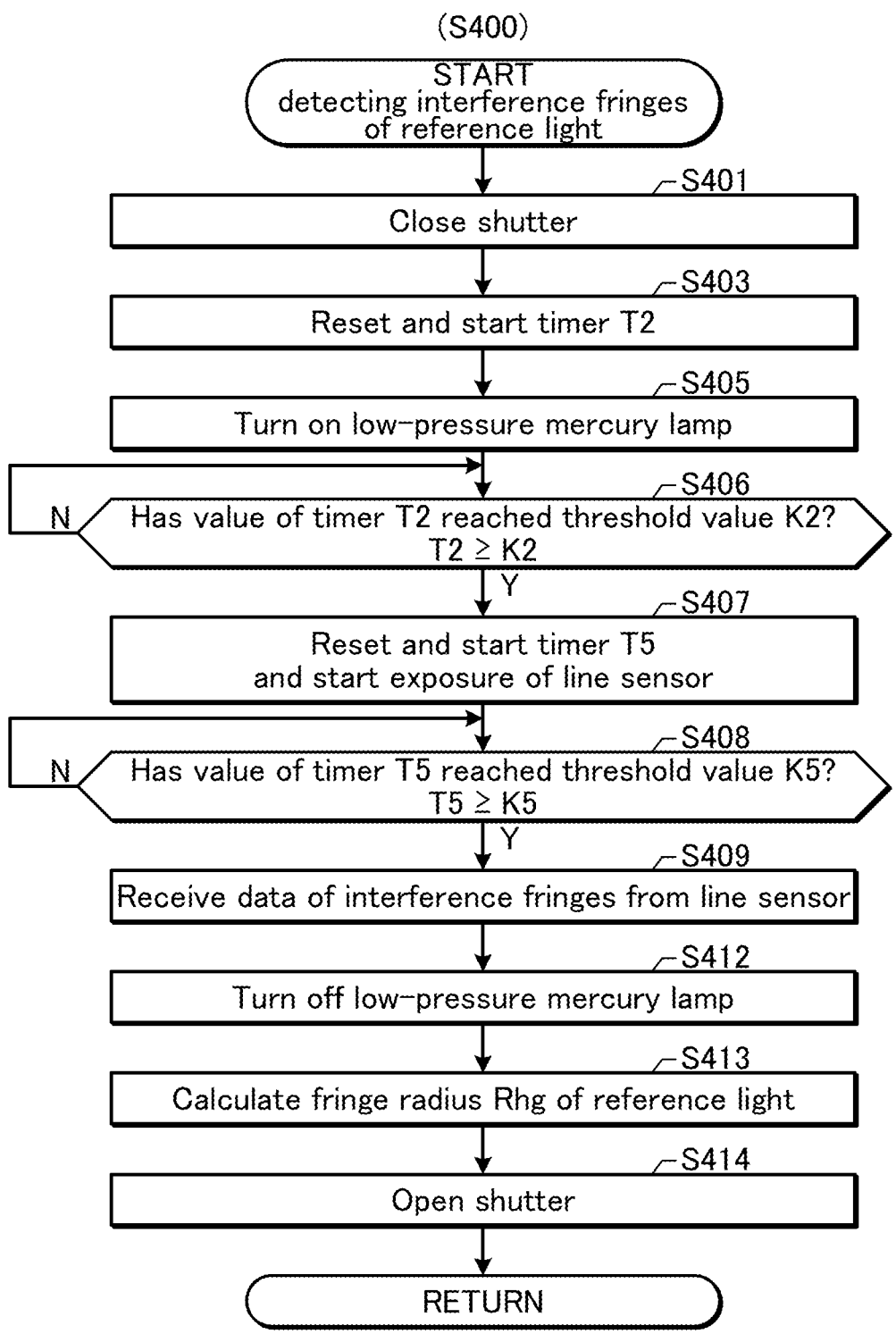
FIG. 3 is a flowchart showing details of a process of detecting interference fringes of reference light shown in FIG. 2.

FIG. 3 is a flowchart showing the details of the process of detecting the interference fringes of the reference light shown in FIG. 2. The process shown in FIG. 3 is performed as a subroutine of S400 shown in FIG. 2 by the wavelength controller 21.

Figure 4:
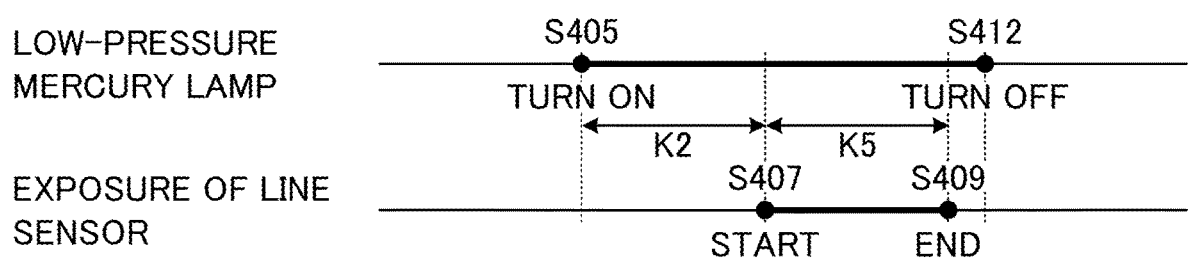
FIG. 4 is a timing chart of a part of the flowchart shown in FIG. 3 for each object to be controlled.

FIG. 4 is a timing chart of a part of the flowchart shown in FIG. 3 for each object to be controlled. FIG. 4 shows the control of the low-pressure mercury lamp 18g and the control of the line sensor 18d.

First, at S401, the wavelength controller 21 controls the actuator 17b to close the shutter 17a.

Next, at S403, the wavelength controller 21 resets and starts a timer T2. The timer T2 is used to measure a time period from turn-on time at which the low-pressure mercury lamp 18g is turned on to the time at which the line sensor 18d starts an exposure.

Next, at S405, the wavelength controller 21 controls the power source 18h to turn on the low-pressure mercury lamp 18g.

Next, at S406, the wavelength controller 21 determines whether or not the value of the timer T2 has reached a threshold value K2. The threshold value K2 may be, for example, 0.5 seconds or more and 2 seconds or less. If the value of the timer T2 has not reached the threshold value K2 (S406: NO), the wavelength controller 21 waits until the value of the timer T2 reaches the threshold value K2. If the value of the timer T2 has reached the threshold value K2 (S406: YES), the wavelength controller 21 proceeds to S407.

Next, at S407, the wavelength controller 21 resets and starts a timer T5. The wavelength controller 21 then causes the exposure of the line sensor 18d to start. The timer T5 is used to measure the exposing period of the line sensor 18d.

Next, at S408, the wavelength controller 21 determines whether or not the value of the timer T5 has reached a threshold value K5. The threshold value K5 may be, for example, 2 seconds or more and 3 seconds or less. If the value of the timer T5 has not reached the threshold value K5 (S408: NO), the wavelength controller 21 waits until the value of the timer T5 reaches the threshold value K5 to allow the exposure of the line sensor 18d to be continued. If the value of the timer T5 has reached the threshold value K5 (S408: YES), the wavelength controller 21 proceeds to S409.

At S409, the wavelength controller 21 outputs the data trigger to the line sensor 18d. The wavelength controller 21 thus causes the exposure of the line sensor 18d to be ended. The wavelength controller 21 then receives the data of the interference fringes from the line sensor 18d.

Next, at S412, the wavelength controller 21 controls the power source 18h to turn off the low-pressure mercury lamp 18g.

Next, at S413, the wavelength controller 21 calculates the fringe radius Rhg of the reference light based on the data of the interference fringes. The fringe radius Rhg of the reference light is used at S800 to calculate the absolute wavelength of the detected light.

Next, at S414, the wavelength controller 21 controls the actuator 17b to open the shutter 17a.

The wavelength controller 21 then ends the process of this flowchart and returns to the process of FIG. 2.

Figure 5:
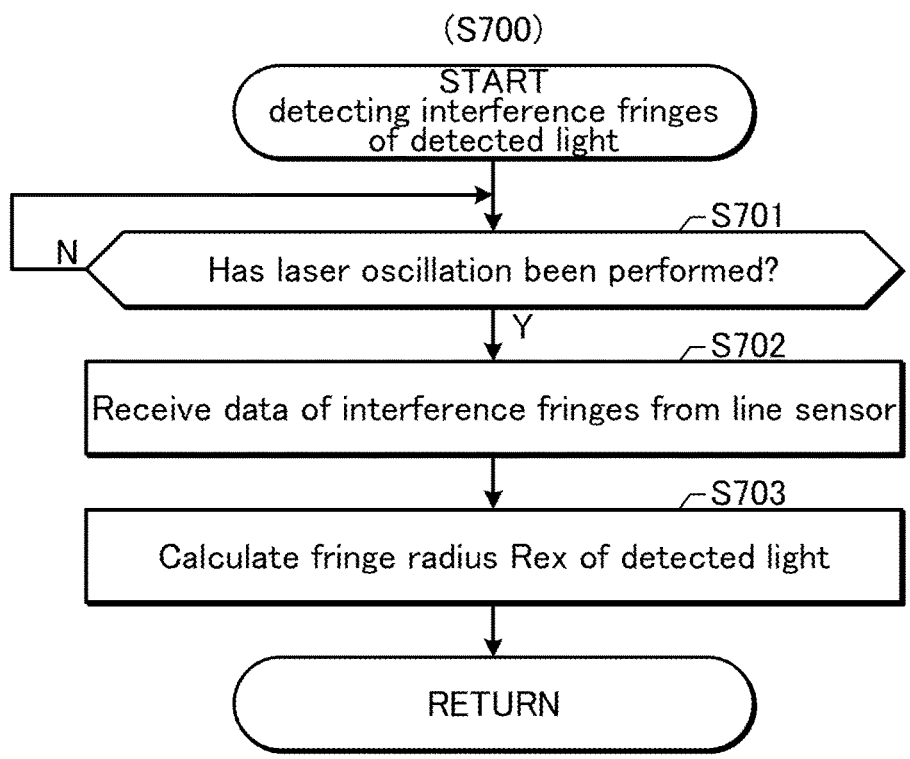
FIG. 5 is a flowchart showing details of a process of detecting interference fringes of detected light shown in FIG. 2.

FIG. 5 is a flowchart showing the details of the process of detecting the interference fringes of the detected light shown in FIG. 2. The process shown in FIG. 5 is performed as a subroutine of S700 shown in FIG. 2 by the wavelength controller 21.

First, at S701, the wavelength controller 21 determines whether or not the laser oscillation has been performed. This determination is performed, for example, by whether or not the wavelength controller 21 has received an electric signal that is generated when the energy sensor 16c detects the pulse energy of the detected light.

Next, at S702, the wavelength controller 21 outputs the data trigger to the line sensor 18d. The wavelength controller 21 then receives the data of the interference fringes of 1 pulse of the detected light from the line sensor 18d.

Next, at S703, the wavelength controller 21 calculates the fringe radius Rex of the detected light based on the data of the interference fringes. The fringe radius Rex of the detected light is used to calculate the absolute wavelength of the detected light at S800.

The wavelength controller 21 then ends the process of this flowchart and returns to the process of FIG. 2.

2.3 Problem

The mercury vapor pressure in the low-pressure mercury lamp is preferably in a range, for example, from 0.8 Pa to 1.0 Pa. However, the mercury vapor pressure in the low-pressure mercury lamp may change. If the mercury vapor pressure is below the range described above, the amount of the mercury atoms to be excited may be insufficient to achieve the desired quantity of light. If the mercury vapor pressure is above the range described above, surplus mercury atoms may cause an increase in self-absorption. The self-absorption in this specification is a phenomenon in which the certain wavelength component of the light emitted from the excited mercury atoms is absorbed by some other mercury atoms existing around the excited mercury atoms and the emission of the light to the outside of the low-pressure mercury lamp is suppressed.

Figure 6:
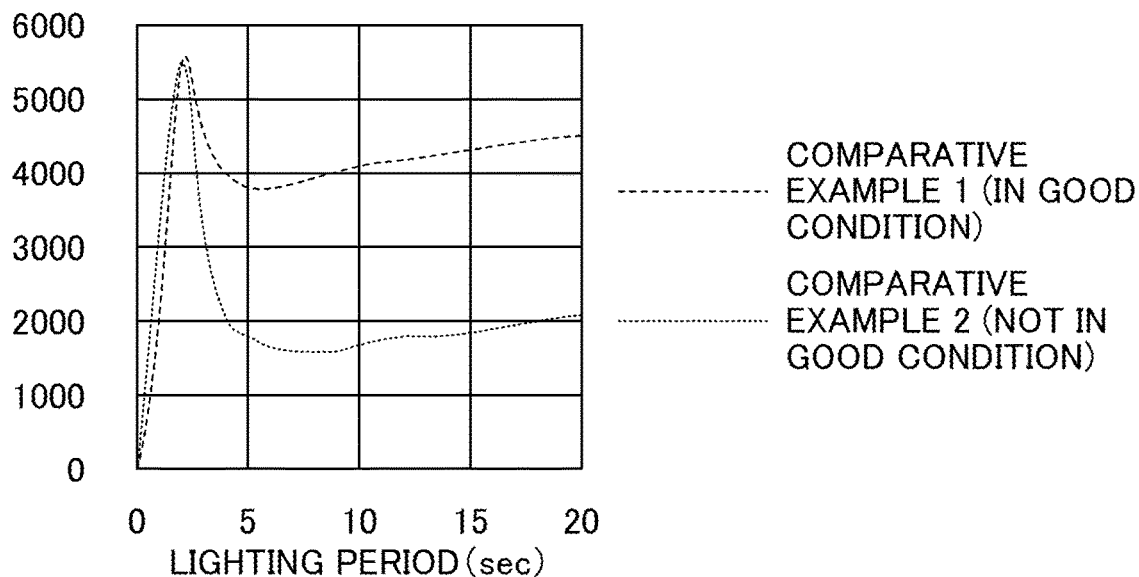
FIG. 6 is a graph showing a relationship between a lighting period from turn-on time at which a low-pressure mercury lamp is turned on and the quantity of light in each of the comparative examples 1 and 2.

FIG. 6 is a graph showing a relationship between a lighting period from the turn-on time at which the low-pressure mercury lamp is turned on and the quantity of light in each of the comparative examples 1 and 2. The low-pressure mercury lamp of the comparative example 1 is one in a relatively good condition. The low-pressure mercury lamp of the comparative example 2 is one not in a good condition.

In each of the comparative examples 1 and 2, the quantity of light reaches the maximum value at approximately 2 seconds from the turn-on time, then decreases once, and then gradually increases after approximately 6 seconds from the turn-on time. In the comparative example 2, the amount of decrease in the quantity of light is large after approximately 2 seconds from the turn-on time. In the comparative example 2, even though the quantity of light gradually increases after approximately 6 seconds from the turn-on time, the quantity of light is less than half of that of the comparative example 1.

Bad influence by the self-absorption is not limited to the reduction in the quantity of light of the low-pressure mercury lamp. The self-absorption especially involves absorption of a certain wavelength component according to the isotope of mercury. Thus, in the spectrum of the reference light incident on the etalon, the ratio of the wavelength components other than the certain wavelength may increase. The high ratio of the wavelength components other than the certain wavelength causes the interference fringes of the reference light to be difficult to be read.

Figure 7A:
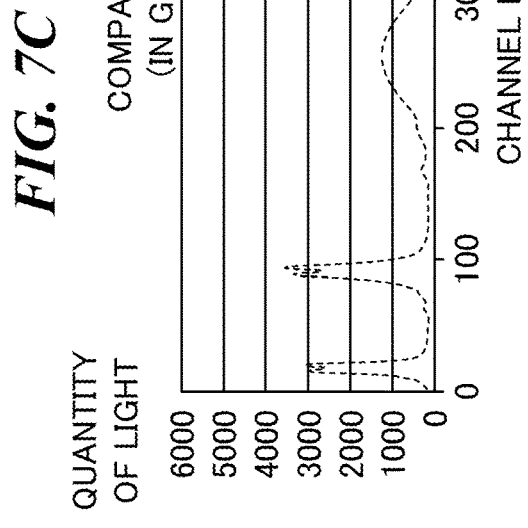
FIGS. 7A to 7D each shows an intensity distribution profile of the interference fringes of the reference light generated by the low-pressure mercury lamp and incident on an etalon in the comparative example 1.
Figure 7C:
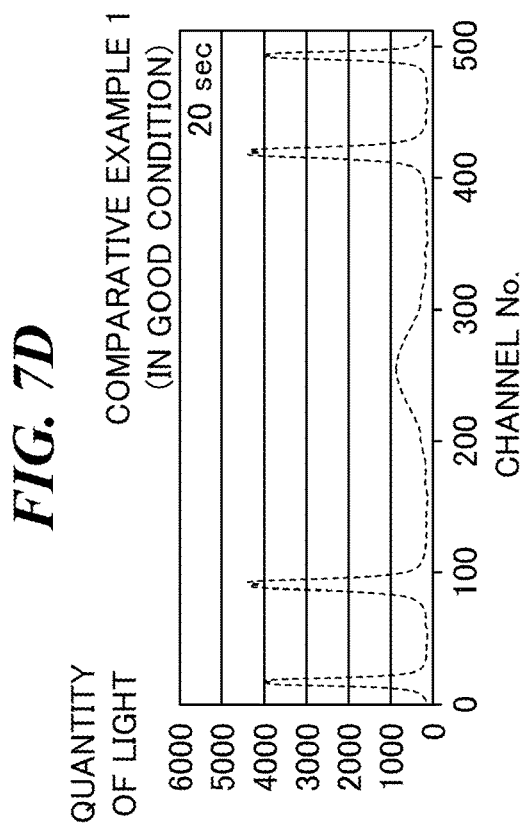
Figure 7B:
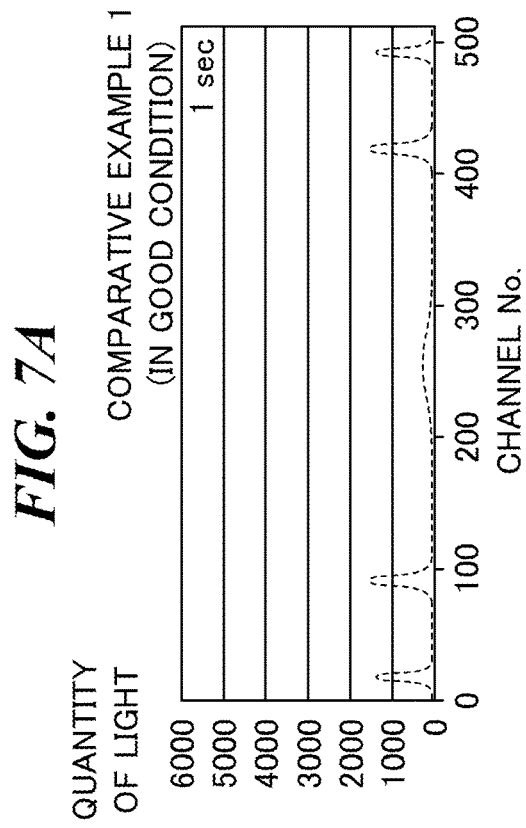
Figure 7D:
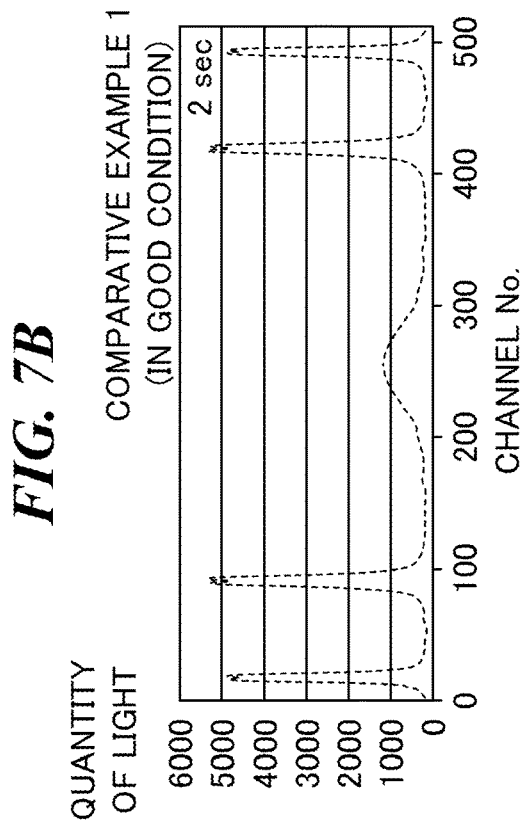

FIGS. 7A to 7D each shows an intensity distribution profile of the interference fringes of the reference light generated by the low-pressure mercury lamp and incident on the etalon in the comparative example 1. FIG. 7A shows the intensity distribution profile of the interference fringes at 1 second from the turn-on time. FIG. 7B shows the intensity distribution profile of the interference fringes at 2 seconds from the turn-on time. FIG. 7C shows the intensity distribution profile of the interference fringes at 6 seconds from the turn-on time. FIG. 7D shows the intensity distribution profile of the interference fringes at 20 seconds from the turn-on time.

Figure 8A:
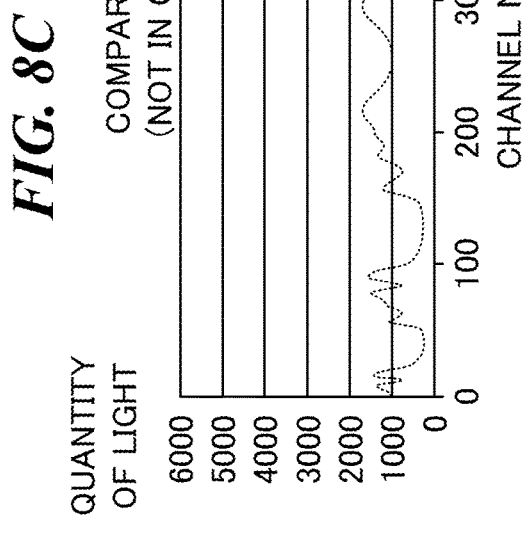
FIGS. 8A to 8D each shows an intensity distribution profile of the interference fringes of the reference light generated by the low-pressure mercury lamp and incident on an etalon in the comparative example 2.
Figure 8C:
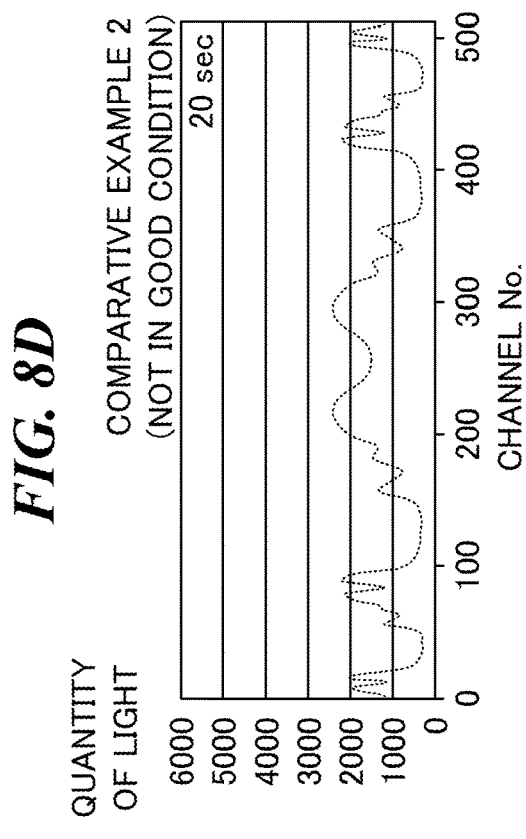
Figure 8B:
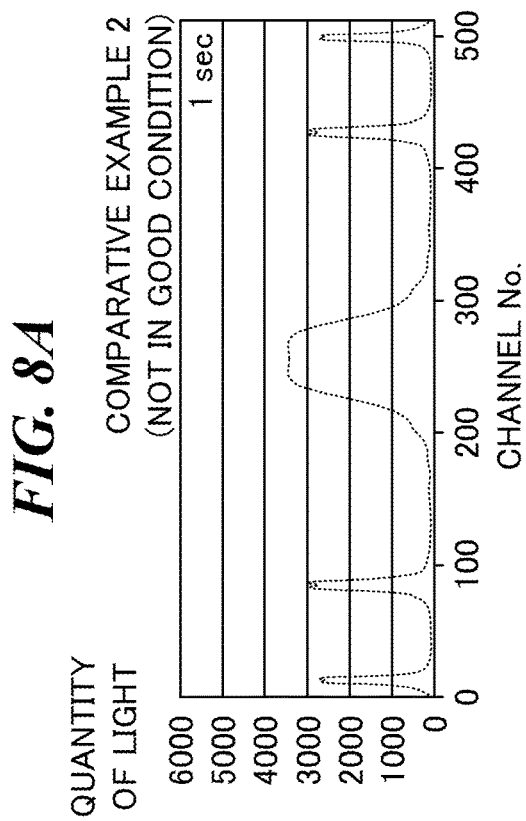
Figure 8D:
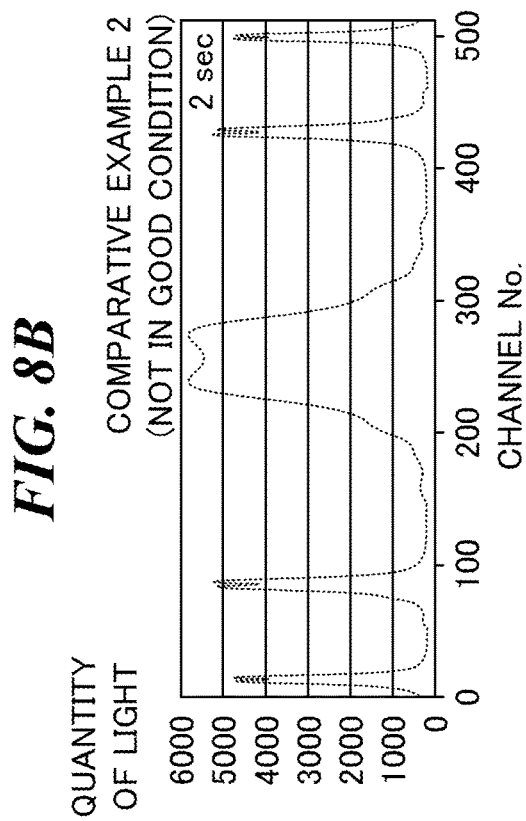

FIGS. 8A to 8D each shows an intensity distribution profile of the interference fringes of the reference light generated by the low-pressure mercury lamp and incident on the etalon in the comparative example 2. FIG. 8A shows the intensity distribution profile of the interference fringes at 1 second from the turn-on time. FIG. 8B shows the intensity distribution profile of the interference fringes at 2 seconds from the turn-on time. FIG. 8C shows the intensity distribution profile of the interference fringes at 6 seconds from the turn-on time. FIG. 8D shows the intensity distribution profile of the interference fringes at 20 seconds from the turn-on time.

The "Channel No" shown in the horizontal axis in each of FIGS. 7A to 7D and 8A to 8D corresponds to each of the light-receiving elements of the line sensor 18d. The vertical axis represents the quantity of light.

In each of the comparative examples 1 and 2, the self-absorption is not significant at approximately 1 second from the turn-on time at which the low-pressure mercury lamp is turned on (see FIGS. 7A and 8A). However, at approximately 2 seconds from the turn-on time, although the quantity of light is the maximum, each of the peak portions of the interference fringes has a depression due to the self-absorption (see FIGS. 7B and 8B). In the comparative example 1, the depression reaches the maximum at approximately 6 seconds from the turn-on time, and then the depression becomes less significant as the quantity of light recovers (see FIGS. 7C and 7D). in the comparative example 2, the considerably large amount of the self-absorption causes the fringe radius of the reference light to be difficult to be measured after approximately 6 seconds from the turn-on time (see FIGS. 8C and 8D). Even if such an intensity distribution profile of the interference fringes of the reference light is accumulated for a certain period, it results in accumulating noises and failing to improve the accuracy in reading of the interference fringes.

Figure 9:
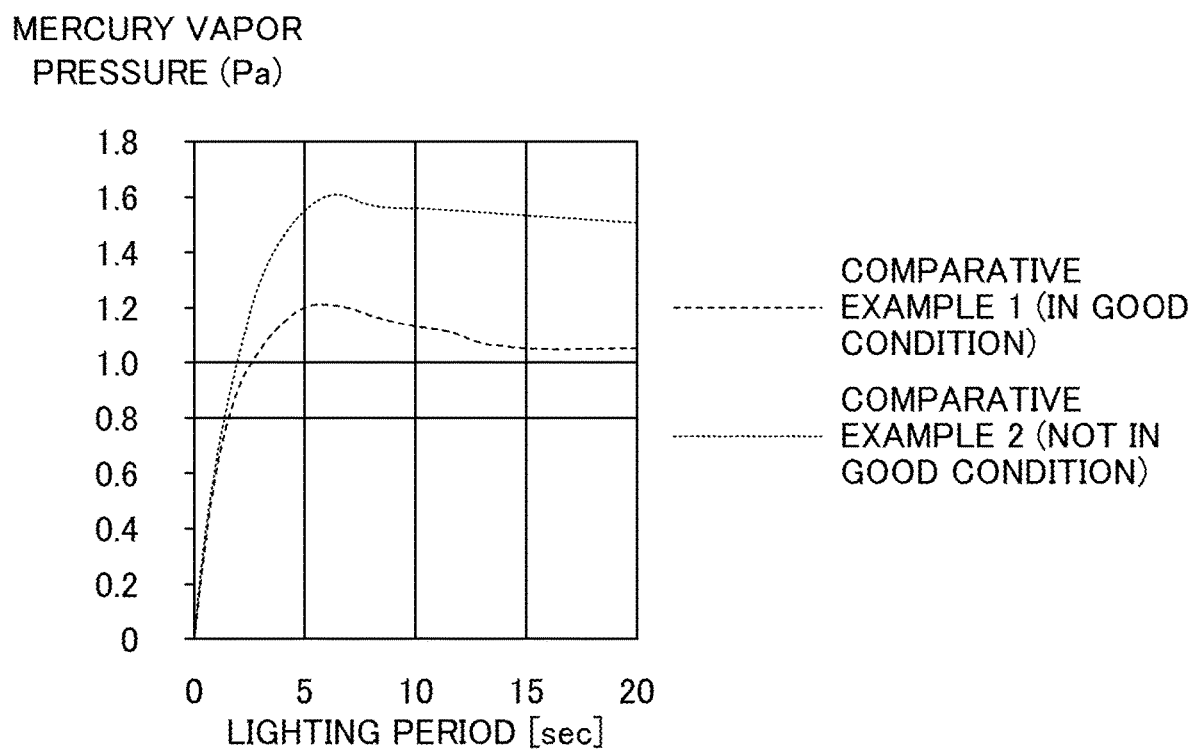
FIG. 9 is a graph showing a relationship between the lighting period from the turn-on time at which a low-pressure mercury lamp is turned on and the mercury vapor pressure in each of the comparative examples 1 and 2.

FIG. 9 is a graph showing a relationship between the lighting period from the turn-on time at which the low-pressure mercury lamp is turned on and the mercury vapor pressure in each of the comparative examples 1 and 2. When the low-pressure mercury lamp is turned on, the hot cathode heats the interior of the low-pressure mercury lamp and causes the mercury vapor pressure in the low-pressure mercury lamp to rapidly increase. In each of the comparative examples 1 and 2, at approximately 2 seconds from the turn-on time, the mercury vapor pressure is in the proper range of the vapor pressure from 0.8 Pa to 1.0 Pa to cause the quantity of light to reach the maximum value as shown in FIG. 6. Then, the mercury vapor pressure further increases to go beyond the proper range of the vapor pressure. The low-pressure mercury lamp is thus supersaturated. The increase in the mercury vapor pressure to go beyond the proper range in such a short time period makes it difficult to obtain a stable quantity of light or stable interference fringes. Such a rapid increase in the mercury vapor pressure is supposed to be caused by the fact that mercury adheres to the hot cathode or something in the vicinity of the hot cathode in the off-state of the low-pressure mercury lamp and is rapidly heated after the low-pressure mercury lamp is turned on. After approximately 6 seconds from the turn-on time, the mercury vapor pressure gradually decreases. However, as described in the comparative example 2, the difference between the mercury vapor pressure and the proper vapor pressure may still be large at approximately 20 seconds from the turn-on time.

Possible measures to control the mercury vapor pressure may include providing a temperature regulator to the low-pressure mercury lamp or providing a space where low-temperature mercury gathers in the low-pressure mercury lamp. However, such measures may cause the apparatus to be complex or be expensive.

Figure 10A:
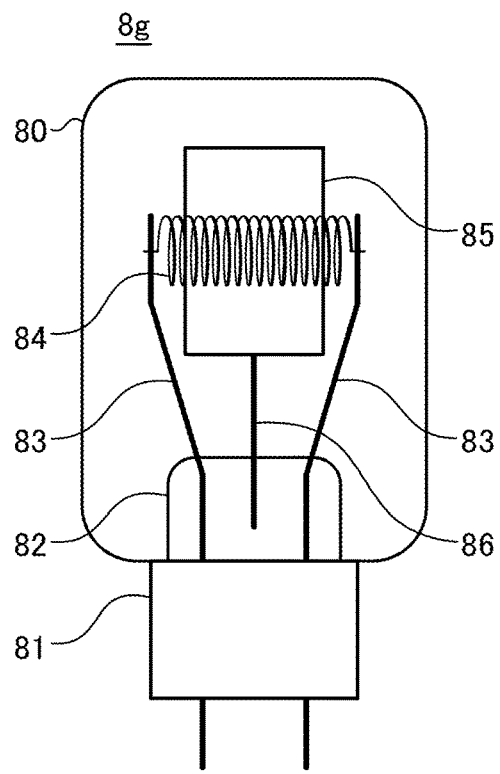
FIGS. 10A and 10B schematically show a configuration of a low-pressure mercury lamp 8g used in a line-narrowed excimer laser apparatus according to a first embodiment of the present disclosure.
Figure 10B:
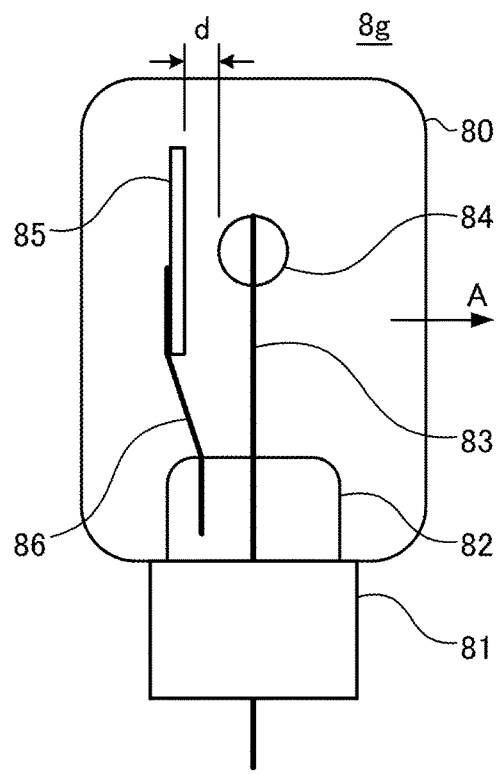

3. Low-Pressure Mercury Lamp in Which Getter Material Is Provided 3.1 Configuration FIGS. 10A and 10B schematically show a configuration of a low-pressure mercury lamp 8g used in a line-narrowed excimer laser apparatus according to a first embodiment of the present disclosure. Instead of the low-pressure mercury lamp 18g of the line-narrowed excimer laser apparatus according to the comparative examples, the line-narrowed excimer laser apparatus according to the first embodiment uses the low-pressure mercury lamp 8g. In the other aspects, configurations of the line-narrowed excimer laser apparatus according to the first embodiment may be substantially the same as that according to the comparative examples. The low-pressure mercury lamp 8g includes a quartz tube 80, a base 81, a flare 82, two stems 83, a filament 84, an amalgamated plate 85, and a supporting rod 86.

The quartz tube 80 accommodates mercury. The opening of the quartz tube 80 is sealed by the base 81. In the quartz tube 80, the flare 82 is fixed to the base 81. The stems 83 are fixed to the flare 82. Each of the stems 83 penetrates both the flare 82 and the base 81 and is projected from the quartz tube 80 as an electrode pin. The filament 84 as a hot cathode is fixed between the stems 83 in the quartz tube 80. The stems 83 and the filament 84 constitute an electric current path in the quartz tube 80.

In the quartz tube 80, the amalgamated plate 85 is provided as a getter material that adsorbs mercury. For example, the amalgamated plate 85 is fixed to the supporting rod 86 by brazing and the supporting rod 86 is fixed to the flare 82. A surface of the amalgamated plate 85 opposite to the surface facing the filament 84 is brazed to the supporting rod 86. Amalgam is an alloy including mercury. The amalgamated plate 85 is configured by an alloy of, for example, indium, silver, and mercury. The amalgamated plate 85 has multiple projections and depressions on its surface to achieve a large surface area. The amalgamated plate 85 is arranged such that the shortest distance d from the filament 84 is a predetermined value. In this specification, the shortest distance is the value of the minimum gap between objects. For example, the shortest distance between two spherical objects is a value obtained by subtracting the sum of the radiuses of the spherical objects from the distance between the centers of the spherical objects. The shortest distance d is preferably 2 mm or more and 6 mm or less. The amalgamated plate 85 is arranged at a position shifted from an approximate center of the low-pressure mercury lamp 8g in the direction opposite to a direction A of the light traveling toward the etalon 18b from the approximate center.

Figure 11:
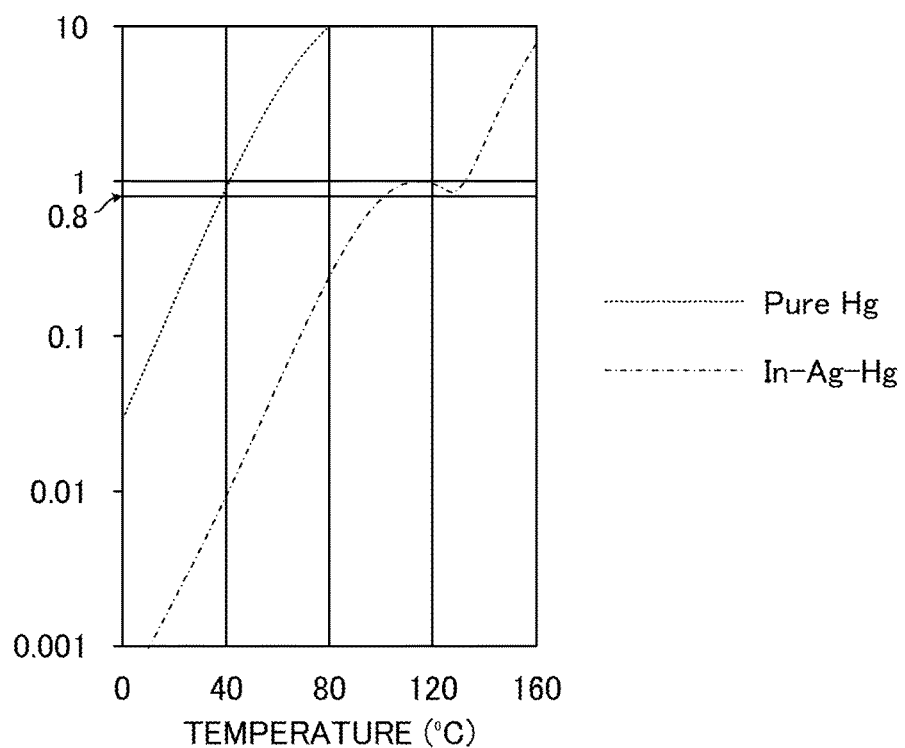
FIG. 11 is a graph showing the mercury vapor pressure vaporized from pure mercury and the mercury vapor pressure vaporized from amalgam.

FIG. 11 is a graph showing the mercury vapor pressure vaporized from pure mercury and the mercury vapor pressure vaporized from amalgam. The horizontal axis shows the temperature and the vertical axis shows the mercury vapor pressures on a logarithmic scale. As shown in FIG. 11, in the same environmental temperature, the mercury vapor pressure vaporized from amalgam is approximately 2-digit lower than the mercury vapor pressure vaporized from pure mercury. Thus, most of the mercury sealed in the low-pressure mercury lamp 8g is absorbed by the amalgamated plate 85 in the off-state of the low-pressure mercury lamp 8g. When the low-pressure mercury lamp 8g is turned on, mercury is vaporized from the amalgamated plate 85. However, surplus increase in the mercury vapor pressure is suppressed.

As shown in FIG. 11, the mercury vapor pressure vaporized from amalgam increases as the environmental temperature increases. However, there are at least one local maximum value and at least one local minimum value. The local maximum value is preferably 0.8 Pa or higher and 1.2 Pa or lower. The local minimum value is preferably 0.6 Pa or higher and 1.0 Pa or lower. The local minimum value is lower than the local maximum value. The use of the amalgam having such characteristics extends the time period in which the mercury vapor pressure is in the proper range of 0.8 Pa or higher and 1.0 Pa or lower.

Figure 12A:
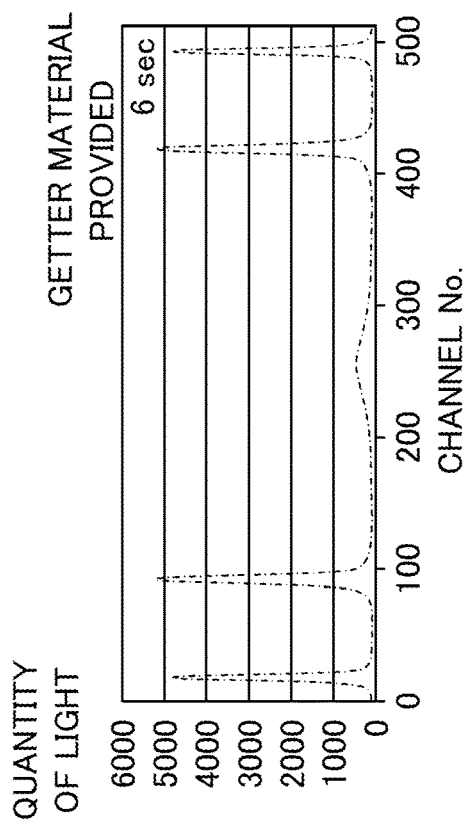
FIGS. 12A to 12D each shows an intensity distribution profile of the interference fringes of the reference light generated by the low-pressure mercury lamp in the first embodiment.
Figure 12C:
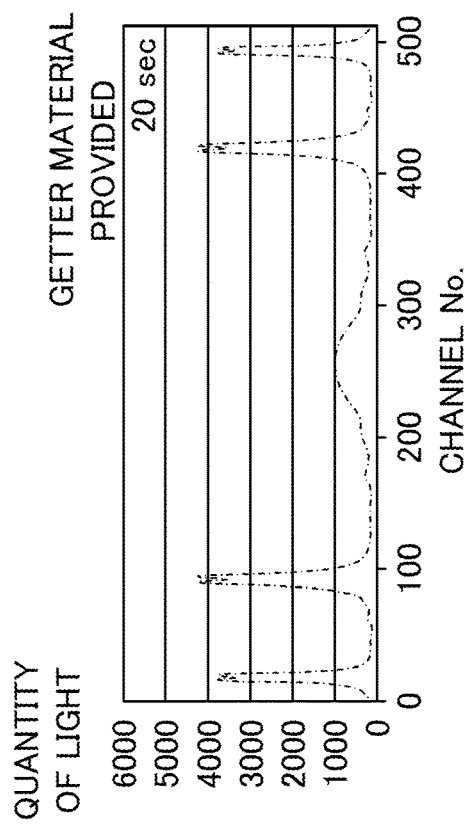
Figure 12B:
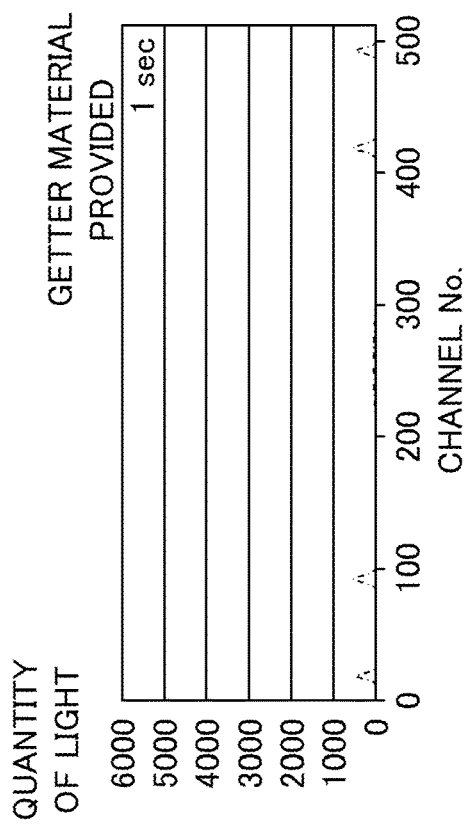
Figure 12D:
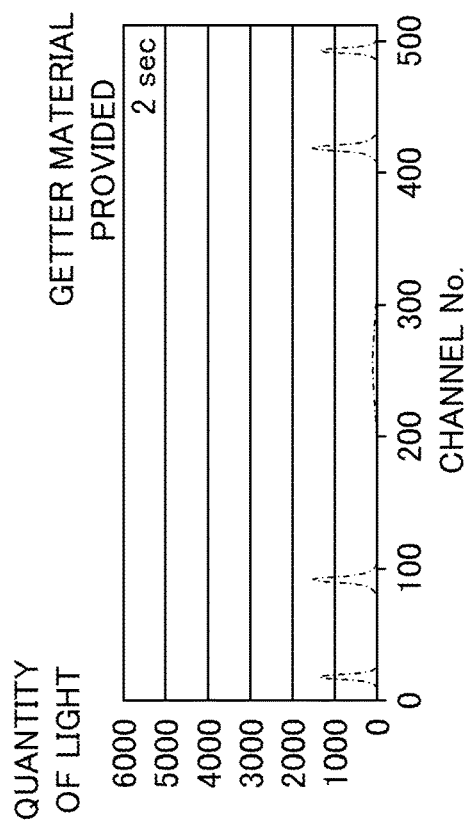

FIGS. 12A to 12D each shows an intensity distribution profile of the interference fringes of the reference light generated by the low-pressure mercury lamp in the first embodiment. FIG. 12A shows the intensity distribution profile of the interference fringes at 1 second from the turn-on time. FIG. 12B shows the intensity distribution profile of the interference fringes at 2 seconds from the turn-on time. FIG. 12C shows the intensity distribution profile of the interference fringes at 6 seconds from the turn-on time. FIG. 12D shows the intensity distribution profile of the interference fringes at 20 seconds from the turn-on time.

According to the first embodiment, the depression caused by the self-absorption occurs by the time of 20 seconds from the turn-on time at which the low-pressure mercury lamp is turned on (see FIG. 12D). However, for at least 6 seconds from the turn-on time, the depression due to the self-absorption is almost inconspicuous in the intensity distribution profiles (see FIGS. 12A to 12C). Although the quantity of light is relatively low immediately after the turn-on time, the quantity of light is sufficient at 6 seconds from the turn-on time (see FIGS. 12A to 12C).

Figure 13:
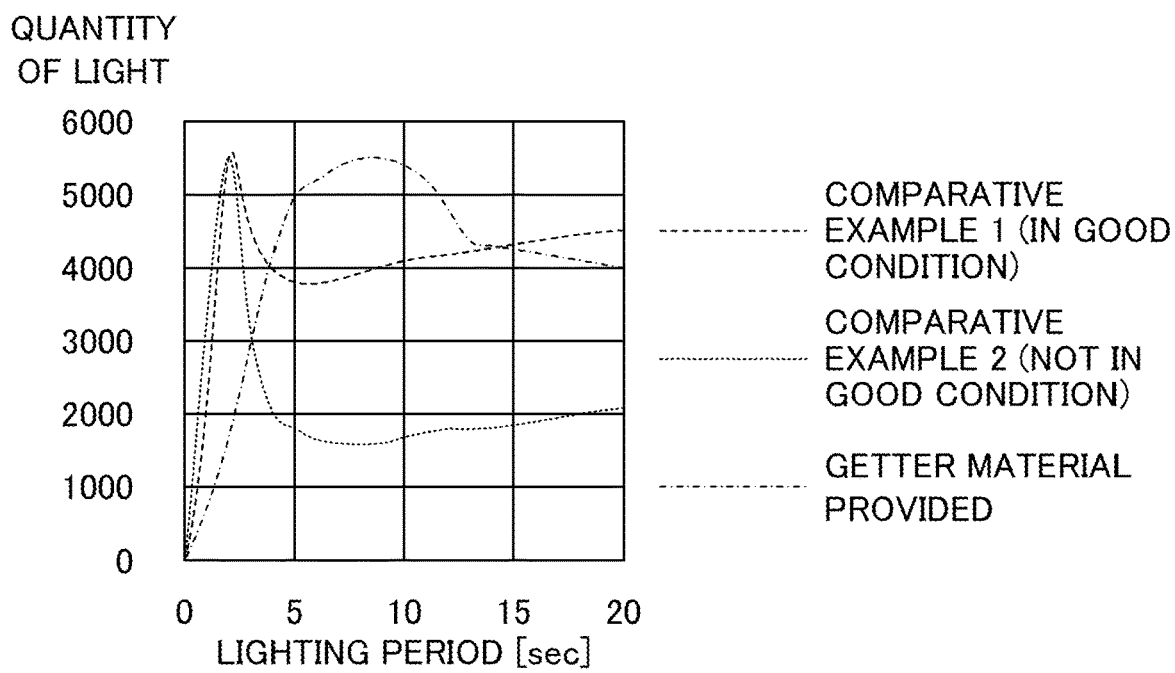
FIG. 13 is a graph showing a relationship between the lighting period from the turn-on time at which the low-pressure mercury lamp 8g is turned on and the quantity of light in the first embodiment.

FIG. 13 is a graph showing a relationship between the lighting period from the turn-on time at which the low-pressure mercury lamp 6g is turned on and the quantity of light in the first embodiment. FIG. 13 also shows the graph for the comparative examples 1 and 2 shown in FIG. 6. In the low-pressure mercury lamp 8g in which the getter material is provided, the rise in the quantity of light immediately after the turn-on time is slightly gentler than in the comparative examples. However, in a time period from the time of approximately 5 seconds from the turn-on time to the time of approximately 12 seconds from the turn-on time, a stable high quantity of light is achieved.

Figure 14:
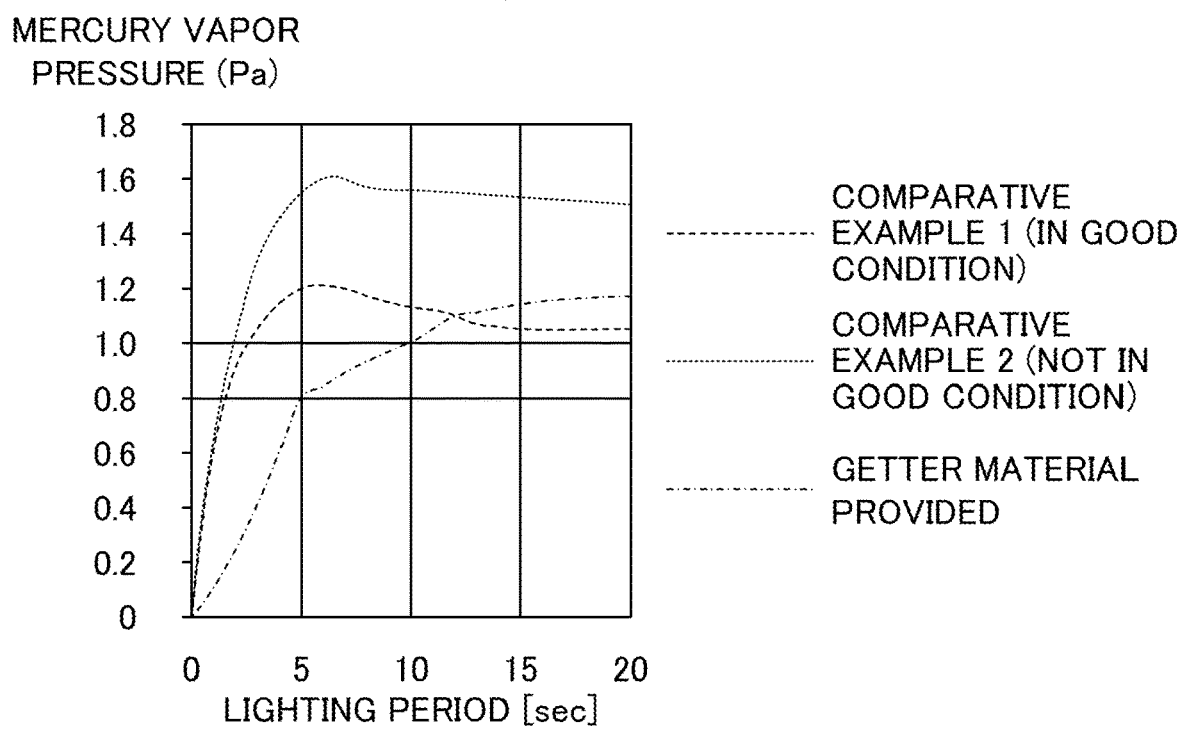
FIG. 14 is a graph showing a relationship between the lighting period from the turn-on time at which the low-pressure mercury lamp 8g is turned on and the mercury vapor pressure in the first embodiment.

FIG. 14 is a graph showing a relationship between the lighting period from the turn-on time at which the low-pressure mercury lamp 8g is turned on and the mercury vapor pressure in the first embodiment. FIG. 14 also shows the graph in the comparative examples 1 and 2 shown in FIG. 9. In the low-pressure mercury lamp 8g in which the getter material is provided, the rise in the mercury vapor pressure immediately after the turn-on time is gentler than in the comparative examples. Further, the rise in the mercury vapor pressure after approximately 5 seconds from the turn-on time is still gentler. Thus, in a time period from the time of approximately 5 seconds from the turn-on time to the time of approximately 10 seconds from the turn-on time, the mercury vapor pressure is in the proper range of the vapor pressure from 0.8 Pa to 1.0 Pa.

3.2 Operation
3.2.1 First Example

Figure 15:
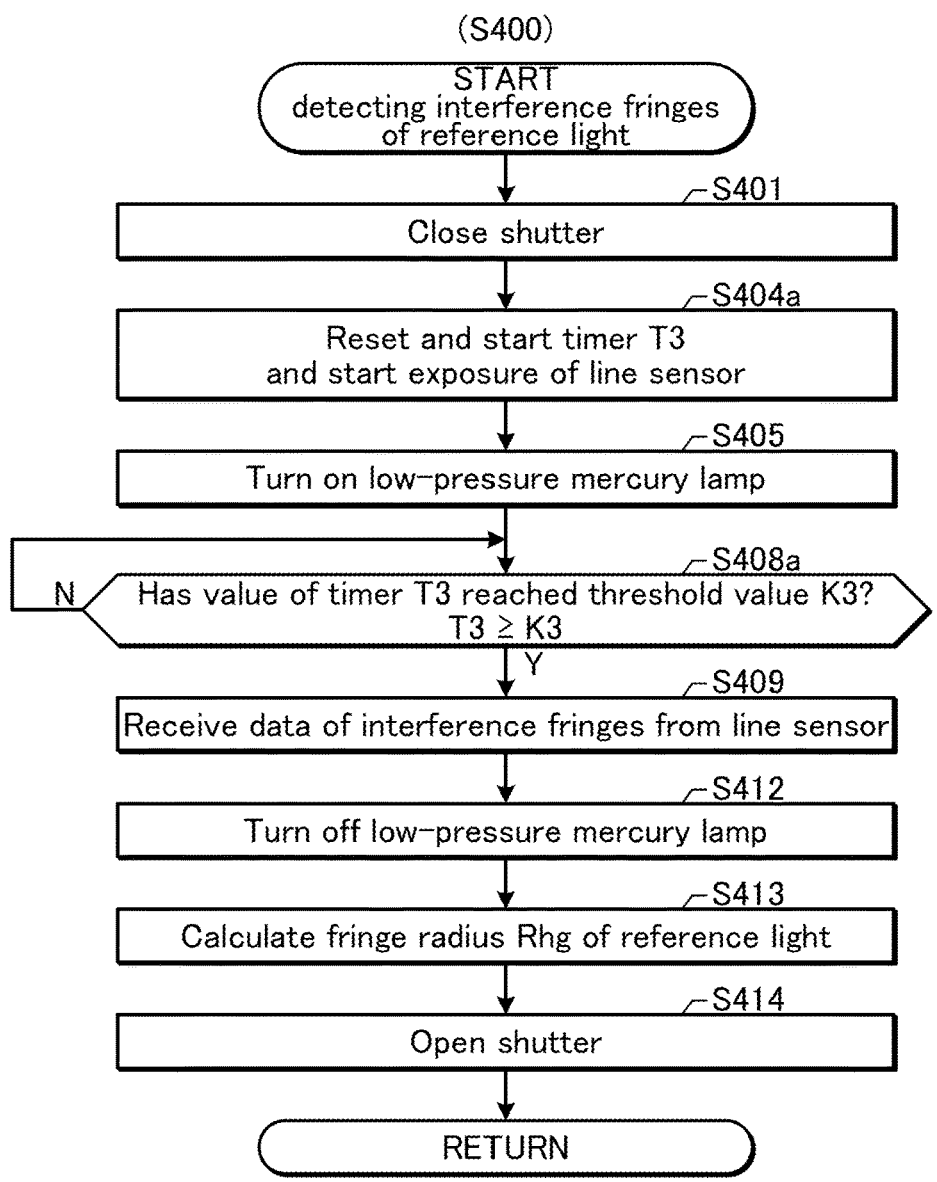
FIG. 15 is a flowchart showing a process of detecting interference fringes of the reference light in a first example of the first embodiment.

FIG. 15 is a flowchart showing a process of detecting interference fringes of the reference light in a first example of the first embodiment. Instead of the process of the comparative examples described with reference to FIG. 3, a process shown in FIG. 15 is performed in the first example of the first embodiment.

Figure 16:
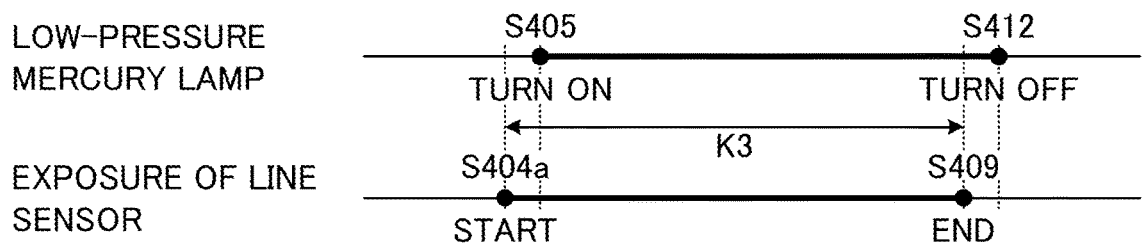
FIG. 16 is a timing chart of a part of the flowchart shown in FIG. 15 for each object to be controlled.

FIG. 16 is a timing chart of a part of the flowchart shown in FIG. 15 for each object to be controlled. FIG. 16 shows the control of the low-pressure mercury lamp 8g and the control of the line sensor 18d.

The process shown in FIG. 15 does not include S403, S406, and S407 described with reference to FIG. 3. The process shown in FIG. 15 includes S404a to S408a.

First, at S401, the wavelength controller 21 controls the actuator 17b to close the shutter 17a.

Next, at S404a, the wavelength controller 21 resets and starts a timer T3. Further, the wavelength controller 21 starts the exposure of the line sensor 18d. The timer T3 is used for measuring the exposing period of the line sensor 18d.

Next, at S405, the wavelength controller 21 controls the power source 18h to turn on the low-pressure mercury lamp 8g.

Next, at S408a, the wavelength controller 21 determines whether or not the value of the timer T3 has reached a threshold value K3. The threshold value K3 may be, for example, 5 seconds or more and 30 seconds or less. If the value of the timer T3 has not reached the threshold value K3 (S408a: NO), the wavelength controller 21 waits until the value of the timer T3 reaches the threshold value K3 to allow the exposure of the line sensor 18d to be continued. If the value of the timer T3 has reached the threshold value K3 (S408a: YES), the wavelength controller 21 proceeds to S409.

S409 and subsequent process thereof are substantially the same as those in FIG. 3.

In the other aspects, the process of the first example of the first embodiment is substantially the same as the process described with reference to FIGS. 2 and 5.

In the first example, the low-pressure mercury lamp 8g accommodates the getter material. Thus, the time period from the turn-on time to the time of the occurrence of the depression is long and the depression is small. Further, after starting the exposure of the line sensor 18d at S404a, the low-pressure mercury lamp 8g is turned on at S405. Accordingly, the intensity distribution profile of the interference fringes having a small depression can be measured for a long time. Further, the quantity of light may be integrated up to almost the exposure saturation amount of the line sensor 18d to obtain the integrated profile. The accuracy in reading the interference fringes is thus improved.

3.2.2 Second Example

Figure 17:
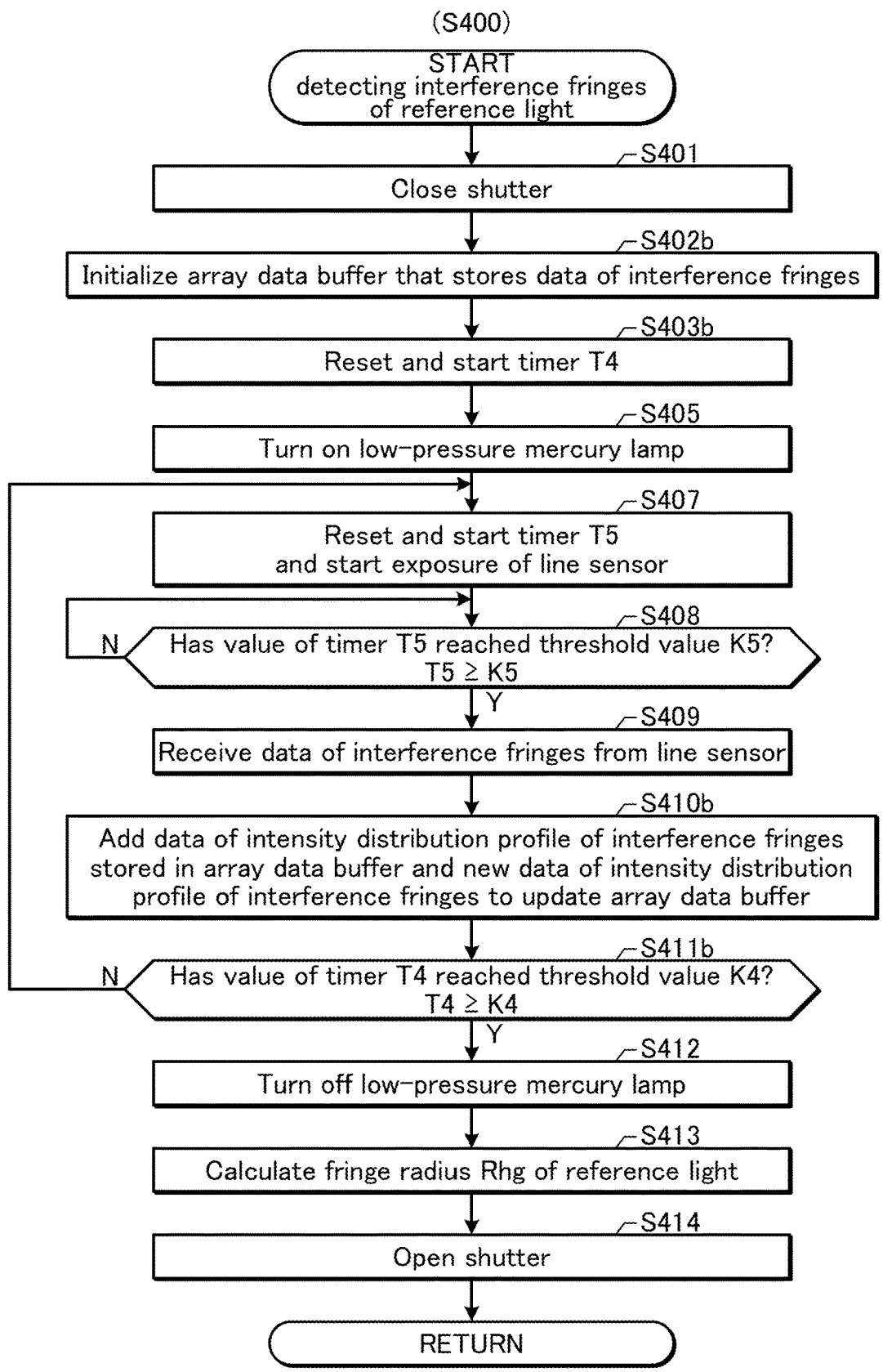
FIG. 17 is a flowchart showing a process of detecting interference fringes of the reference light in a second example of the first embodiment.

FIG. 17 is a flowchart showing a process of detecting interference fringes of the reference light in a second example of the first embodiment. Instead of the process of the comparative examples described with reference to FIG. 3, a process shown in FIG. 17 is performed in the second example of the first embodiment.

Figures 18, 19:
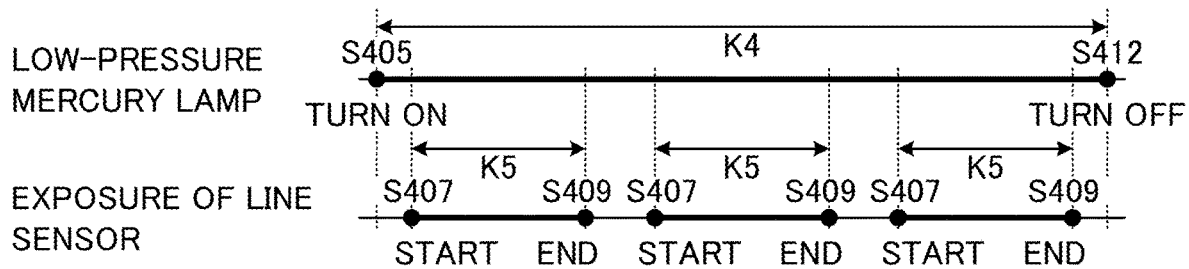
FIG. 18 is a timing chart of a part of the flowchart shown in FIG. 17 for each object to be controlled.
FIG. 19 shows an example of an array data buffer used in the second example of the first embodiment.

FIG. 18 is a timing chart of a part of the flowchart shown in FIG. 17 for each object to be controlled. FIG. 18 shows the control of the low-pressure mercury lamp 8g and the control of the line sensor 18d.

The process shown in FIG. 17 does not include S403 and S406 described with reference to FIG. 3. The process shown in FIG. 15 includes S402b to S411b.

First, at S401, the wavelength controller 21 controls the actuator 17b to close the shutter 17a.

Next, at S402b, the wavelength controller 21 initializes an array data buffer that stores data of the interference fringes.

FIG. 19 shows an example of the array data buffer used in the second example of the first embodiment. The array data buffer has storage areas for storing the quantity of light corresponding to each of the channel numbers to store the data of the intensity distribution profile of the interference fringes. For example, if the line sensor 18d includes channels from No. 0 to No. 511, a total of 512 storage areas for storing the quantity of light are provided in the array data buffer. At S402b, the values stored in the storage areas of the array data buffer are all set to 0.

Next, at S403b, the wavelength controller 21 resets and starts a timer T4. The timer T4 is used for measuring the lighting period of the low-pressure mercury lamp 8g.

Next, at S405, the wavelength controller 21 controls the power source 18h to turn on the low-pressure mercury lamp 8g.

Next, at S407, the wavelength controller 21 resets and starts the timer T5. Further, the wavelength controller 21 starts the exposure of the line sensor 18d. The timer T5 is used for measuring the exposing period of the line sensor 18d.

Next, at S408, the wavelength controller 21 determines whether or not the value of the timer T5 has reached the threshold value K5. The threshold value K5 may be, for example, 2 seconds or more and 3 seconds or less. If the value of the timer T5 has not reached the threshold value K5 (S408: NO), the wavelength controller 21 waits until the value of the timer T5 reaches the threshold value K5 to allow the exposure of the line sensor 18d to be continued. If the value of the timer T5 has reached the threshold value K5 (S408: YES), the wavelength controller 21 proceeds to S409.

At S409, the wavelength controller 21 outputs the data trigger to the line sensor 18d. The wavelength controller 21 thus causes the exposure of the line sensor 18d to be ended. The wavelength controller 21 then receives the data of the interference fringes from the line sensor 18d.

Next, at S410b, the wavelength controller 21 adds the data of the intensity distribution profile of the interference fringes stored in the array data buffer and the new data of the intensity distribution profile of the interference fringes. The array data buffer is thus updated.

Next, at S411b, the wavelength controller 21 determines whether or not the value of the timer T4 has reached a threshold value K4. The threshold value K4 is, for example, 5 seconds or more and 30 seconds or less. If the value of the timer T4 has not reached the threshold value K4 (S411b: NO), the wavelength controller 21 returns to S407 with the low-pressure mercury lamp 8g kept on-state, to repeat the exposure of the line sensor 18d. By updating the array data buffer at S410b, a cumulative profile is calculated. If the value of the timer T4 has reached the threshold value K4 (S411b: YES), the wavelength controller 21 proceeds to S412.

S412 and subsequent process thereof are substantially the same as those in FIG. 3.

In the other aspects, the process of the second example of the first embodiment is substantially the same as the process described with reference to FIGS. 2 and 5.

In the second example, the low-pressure mercury lamp 8g stores the getter material. Thus, the time period from the turn-on time to the time of the occurrence of the depression is long and the depression is small. Accordingly, the intensity distribution profile of the interference fringes having a small depression can be accumulated for a long time.

Further, in the second example, the wavelength controller 21 performs the exposure of the line sensor 18d more than once and adds the intensity distribution profile of the interference fringes more than once. Accordingly, the intensity distribution profile can be accumulated beyond the exposure saturation amount per one process of the exposure of the line sensor 18d. The accuracy in reading the interference fringes is thus improved.

4. Variations in Shortest Distance d Between Getter Material and Filament

FIG. 20 is a graph showing a relationship between the lighting period from the turn-on time at which the low-pressure mercury lamp 8g is turned on and the quantity of light in a line-narrowed excimer laser apparatus according to a second embodiment of the present disclosure. The low-pressure mercury lamp 8g of the second embodiment includes one of arrangement examples 1 to 3 of arranging the getter material. The shortest distance d between the filament 84 and the amalgamated plate 85 in the arrangement example 1 is 2 mm. The shortest distance d in the arrangement example 2 is 4 mm. The shortest distance d in the arrangement example 3 is 6 mm. In the other aspects, the line-narrowed excimer laser apparatus according to the second embodiment may be substantially the same as the line-narrowed excimer laser apparatus according to the first embodiment. FIG. 20 also shows the relationship between the lighting period from the turn-on time at which the low-pressure mercury lamp 18g is turned on and the quantity of light in the comparative example 1.

FIG. 21 shows, for each of the arrangement examples 1 to 3 of arranging the getter material shown in FIG. 20, the shortest distance d between the filament 84 and the amalgamated plate 85, the time of the occurrence of the depression from the turn-on time, and the integrated quantity of light integrated until the time of the occurrence of the depression from the turn-on time. FIG. 21 also shows the time of the occurrence of the depression from the turn-on time in the comparative example 1. In FIG. 21, the integrated quantity of light integrated until the time of the occurrence of the depression from the turn-on time is shown in the ratio to the integrated quantity of light in the comparative example 1. The time of the occurrence of the depression shown in FIG. 21 is shown by a downward arrow in FIG. 20 for each example.

As shown in FIG. 20, in the comparative example 1, the quantity of light rapidly rises immediately after the turn-on time and starts decreasing in approximately 2 seconds from the turn-on time. As compared to the comparative example 1, in each of the arrangement examples 1 to 3, the rise in the quantity of light after the turn-on time is gentle and the time period from the turn-on time to the start of the decrease in the quantity of light is long. Among the arrange arrangement examples 1 to 3, the rise in the quantity of light after the turn-on time is gentler and the time period from the turn-on time to the start of the decrease in the quantity of light is longer in the case where the shortest distance d is long than in the case where the shortest distance d is short. The time period from the turn-on time to the start of the decrease in the quantity of light is preferably 5 seconds or more and 60 seconds or less.

As shown in FIGS. 20 and 21, the depression occurs later in each of the arrangement examples 1 to 3 than in the comparative example 1. Among the arrangement examples 1 to 3, the depression occurs later in the case where the shortest distance d is long than in the case where the shortest distance d is short. The time of the occurrence of the depression from the turn-on time is preferably 10 seconds or more and 30 seconds or less from the turn-on time.

As shown in FIG. 21, the integrated quantity of light integrated until the time of the occurrence of the depression is higher in each of the arrangement examples 1 to 3 than in the comparative example 1. Among the arrangement examples 1 to 3, the integrated quantity of light integrated until the time of the occurrence of the depression is higher in the case where the shortest distance d is long than in the case where the shortest distance d is short.

According to the results described above, the accuracy in reading the interference fringes may thus be improved in the case where the shortest distance d is long. In contrast, the rise in the quantity of light immediately after the turn-on time is more rapid in the case where the shortest distance d is short than in the case where the shortest distance d is long. The measurement of the interference fringes of the reference light may thus be accelerated in the case where the shortest distance d is short.

If there is some deviation in the shortest distance d among low-pressure mercury lamps 8g, the time of the occurrence of the depression may be measured for each of the low-pressure mercury lamps 8g. According to the measured time of the occurrence of the depression, the lighting period of the low-pressure mercury lamp 8g or the exposing period of the line sensor 18d may be set.

5. Configuration of Controller

Figure 22:
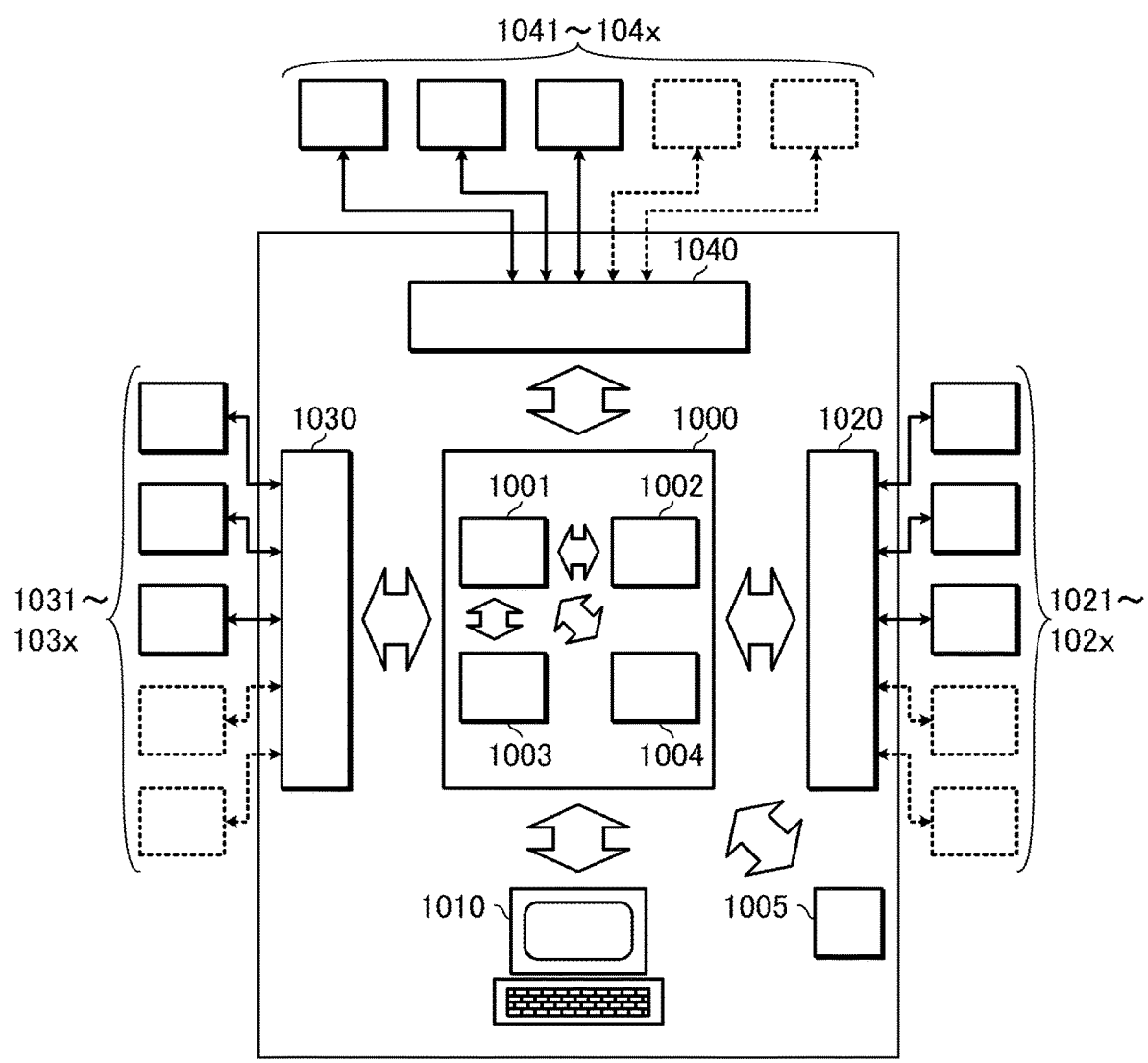
FIG. 22 is a block diagram schematically showing a configuration of a controller.

FIG. 22 is a block diagram schematically showing a configuration of the controller.

Controllers of the above-described embodiments, such as the wavelength controller 21, may be configured by general-purpose control devices, such as computers or programmable controllers. For example, the controllers may be configured as follows.

(Configuration)

The controllers may each include a processor 1000, and a storage memory 1005, a user interface 1010, a parallel input/output (I/O) controller 1020, a serial I/O controller 1030, and an analog-to-digital (A/D) and digital-to-analog (D/A) converter 1040 which are connected to the processor 1000. The processor 1000 may include a central processing unit (CPU) 1001, and a memory 1002, a timer 1003, and a graphics processing unit (GPU) 1004 which are connected to the CPU 1001.

(Operation)

The processor 1000 may read a program stored in the storage memory 1005. The processor 1000 may also execute the read program, read data from the storage memory 1005 or store data in the storage memory 1005 in accordance with the program.

The parallel I/O controller 1020 may be connected to devices 1021 to 102x with which it may communicate through parallel I/O ports. The parallel I/O controller 1020 may control digital-signal communication through the parallel I/O ports while the processor 1000 executes the program.

The serial I/O controller 1030 may be connected to devices 1031 to 103x with which it may communicate through serial I/O ports. The serial I/O controller 1030 may control digital-signal communication through the serial I/O ports while the processor 1000 executes the program.

The A/D and D/A converter 1040 may be connected to devices 1041 to 104x with which it may communicate through analog ports. The A/D and D/A converter 1040 may control analog-signal communication through the analog ports while the processor 1000 executes the program.

The user interface 1010 may be configured to display the progress of the program being executed by the processor 1000 in accordance with instructions from an operator. The user interface 1010 may cause the processor 1000 to stop the execution of the program or perform an interrupt in accordance with instructions from the operator.

The CPU 1001 of the processor 1000 may perform arithmetic processing of the program. The memory 1002 may temporarily store the program being executed by the CPU 1001 or temporarily store data in the arithmetic processing. The timer 1003 may measure time or elapsed time period and output it to the CPU 1001 in accordance with the program being executed. When image data is inputted to the processor 1000, the GPU 1004 may process the image data in accordance with the program being executed and output the results to the CPU 1001.

The devices 1021 to 102x, which are connected through the parallel I/O ports to the parallel. I/O controller 1020, may be the laser controller 20 or the exposure apparatus controller 40 or other controllers or the like.

The devices 1031 to 103x, which are connected through the serial I/O ports to the serial I/O controller 1030, may be the actuator 17b for the shutter 17a or the like.

The devices 1041 to 104x, which are connected through the analog ports to the A/D and D/A converter 1040, may be various sensors such as the line sensor 18d or the like.

The controllers thus configured may be capable of realizing the operations described in the embodiments.

The above descriptions are intended to be only illustrative rather than being limiting. Accordingly, it will be clear to those skilled in the art that variouschanges may be made to the embodiments of the present disclosure without departing from the scope of the appended claims.

The terms used in the present specification and the appended claims are to be interpreted as not being limiting. For example, the term "include" or "included" should be interpreted as not being limited to items described as being included. Further, the term "have" should be interpreted as not being limited to items described as being had. Furthermore, the modifier "a" or an as used in the present specification and the appended claims should be interpreted as meaning "at least one" or "one or more".

The invention claimed is:

1. A line-narrowed KrF excimer laser apparatus comprising:
 a laser chamber including a first window and a second window, the laser chamber accommodating a pair of discharge electrodes and configured to seal a laser gas including krypton gas and fluorine gas;
 a line narrow optical system provided in an optical path of light emitted from the first window;
 an actuator capable of changing a wavelength of light selected by the line narrow optical system;
 an output coupling mirror constituting an optical resonator with the line narrow optical system, the output coupling mirror being provided in an optical path of light emitted from the second window and configured to emit a part of the light emitted from the second window;
 a wavelength detecting unit including
  a low-pressure mercury lamp accommodating mercury, a getter material that adsorbs at least a part of the mercury, and a hot cathode that excites at least a part of the mercury,
  an etalon provided at a position where reference light emitted from the low-pressure mercury lamp and detected light emitted from the output coupling mirror are incident on the etalon, and a light intensity distribution sensor configured to detect an intensity distribution profile of interference fringes of the reference light and an intensity distribution profile of interference fringes of the detected light; and a wavelength controller configured to perform calculating a cumulative profile by accumulating the intensity distribution profile of the interference fringes of the reference light and calculating a wavelength of the detected light based on the cumulative profile and the intensity distribution profile of the interference fringes of the detected light, and controlling the actuator based on results of calculation of the wavelength of the detected light.

2. The line-narrowed KrF excimer laser apparatus according to claim 1, wherein the wavelength controller accumulates the intensity distribution profile of the interference fringes of the reference light for a time period of at least a part of a predetermined period from time at which the low-pressure mercury lamp starts emitting the reference light.

3. The line-narrowed KrF excimer laser apparatus according to claim 1, wherein the wavelength detecting unit detects the intensity distribution profile of the interference fringes of the reference light more than once, and the wavelength controller accumulates the intensity distribution profile of the interference fringes of the reference light by adding the intensity distribution profile of the interference fringes of the reference light more than once.

4. The line-narrowed KrF excimer laser apparatus according to claim 1, wherein a time period from time at which the low-pressure mercury lamp starts emitting the reference light to time of starting decrease in a quantity of light of the reference light emitted from the low-pressure mercury lamp is 5 seconds or more and 60 seconds or less.

5. The line-narrowed KrF excimer laser apparatus according to claim 1, wherein a time period from time at which the low-pressure mercury lamp starts emitting the reference light to time of an occurrence of a depression in the intensity distribution profile of the interference fringes detected by the light intensity distribution sensor is 10 seconds or more and 30 seconds or less.

6. The line-narrowed KrF excimer laser apparatus according to claim 1, wherein the low-pressure mercury lamp has a characteristic of mercury vapor pressure to temperature including a local maximum value of 0.8 Pa or higher and 1.2 Pa or lower and a local minimum value of 0.6 Pa or higher and 1.0 Pa or lower.

7. The line-narrowed KrF excimer laser apparatus according to claim 1, wherein the getter material is provided in a position shifted from an approximate center of the low-pressure mercury lamp in a direction opposite to a traveling direction of the reference light traveling toward the etalon from the approximate center.

8. The line-narrowed KrF excimer laser apparatus according to claim 1, wherein the getter material is provided in a position where a shortest distance from the hot cathode is 2 mm or more and 6 mm or less.

9. The line-narrowed KrF excimer laser apparatus according to claim 1, wherein the getter material includes an alloy of indium, silver, and mercury.

10. The line-narrowed KrF excimer laser apparatus according to claim 1, wherein the mercury accommodated in the low-pressure mercury lamp includes one isotope at 49% or higher.

11. A line-narrowed KrF excimer laser apparatus comprising:

a laser chamber including a first window and a second window, the laser chamber accommodating a pair of discharge electrodes and configured to seal a laser gas including krypton gas and fluorine gas;

a line narrow optical system provided in an optical path of light emitted from the first window;

an actuator capable of changing a wavelength of light selected by the line narrow optical system;

an output coupling mirror constituting an optical resonator with the line narrow optical system, the output coupling mirror being provided in an optical path of light emitted from the second window and configured to emit a part of the light emitted from the second window;

a wavelength detecting unit including a low-pressure mercury lamp accommodating mercury, a getter material that adsorbs at least a part of the mercury, and a hot cathode that excites at least a part of the mercury, an etalon provided at a position where reference light emitted from the low-pressure mercury lamp and detected light emitted from the output coupling mirror are incident on the etalon, and a light intensity distribution sensor configured to detect an intensity distribution profile of interference fringes of the detected light and an integrated profile obtained by integrating an intensity distribution profile of interference fringes of the reference light for a predetermined period from time at which the low-pressure mercury lamp starts emitting the reference light; and a wavelength controller configured to perform calculating a wavelength of the detected light based on the integrated profile and the intensity distribution profile of the interference fringes of the detected light, and controlling the actuator based on results of calculation of the wavelength of the detected light.

12. The line-narrowed KrF excimer laser apparatus according to claim 11, wherein the low-pressure mercury lamp starts emitting the reference light after the light intensity distribution sensor starts exposure.

13. The line-narrowed KrF excimer laser apparatus according to claim 11, wherein the predetermined period is 5 seconds or more and 30 seconds or less.

14. The line-narrowed KrF excimer laser apparatus according to claim 11, wherein a time period from the time at which the low-pressure mercury lamp starts emitting the reference light to time of starting decrease in a quantity of light of the reference light emitted from the low-pressure mercury lamp is 5 seconds or more and 60 seconds or less.

15. The line-narrowed KrF excimer laser apparatus according to claim 11, wherein a time period from the time at which the low-pressure mercury lamp starts emitting the reference light to time of an occurrence of a depression in the intensity distribution profile of the interference fringes detected by the light intensity distribution sensor is 10 seconds or more and 30 seconds or less.

16. The line-narrowed KrF excimer laser apparatus according to claim 11, wherein the low-pressure mercury lamp has a characteristic of mercury vapor pressure to temperature including a local maximum value of 0.8 Pa or higher and 1.2 Pa or lower and a local minimum value of 0.6 Pa or higher and 1.0 Pa or lower.

17. The line-narrowed KrF excimer laser apparatus according to claim 11, wherein the getter material is provided in a position shifted from an approximate center of the low-pressure mercury lamp in a direction opposite to a traveling direction of the reference light traveling toward the etalon from the approximate center.

18. The line-narrowed KrF excimer laser apparatus according to claim 11, wherein the getter material is provided in a position where a shortest distance from the hot cathode is 2 mm or more and 6 mm or less.

19. The line-narrowed KrF excimer laser apparatus according to claim 11, wherein the getter material includes an alloy of indium, silver, and mercury.

20. The line-narrowed KrF excimer laser apparatus according to claim 11, wherein the mercury accommodated in the low-pressure mercury lamp includes one isotope at 49% or higher.

* * * * *